(12) United States Patent
Fukuhara et al.

(10) Patent No.: US 7,907,785 B2
(45) Date of Patent: Mar. 15, 2011

(54) IMAGE PROCESSING APPARATUS AND IMAGE PROCESSING METHOD

(75) Inventors: Takahiro Fukuhara, Kanagawa (JP); Katsutoshi Ando, Tokyo (JP); Naoto Nishimura, Kanagawa (JP); Yuuki Tanaka, Kanagawa (JP); Katsuharu Shimura, Kanagawa (JP); Hiroo Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 981 days.

(21) Appl. No.: 11/745,132

(22) Filed: May 7, 2007

(65) Prior Publication Data

US 2007/0269122 A1   Nov. 22, 2007

(30) Foreign Application Priority Data

May 16, 2006   (JP) ................................. 2006-136876

(51) Int. Cl.
*G06K 9/36* (2006.01)
(52) U.S. Cl. ...................................... 382/240
(58) Field of Classification Search .......... 382/232–234, 382/236, 238–240, 248–250; 348/384.1, 348/394.1–395.1, 398.1–404.1, 408.1, 430.1–431.1; 375/240.11, 240.18, 240.19; 708/317, 400–401
See application file for complete search history.

(56) References Cited

U.S. PATENT DOCUMENTS

| 5,917,943 | A | * | 6/1999 | Washizawa | 382/190 |
| 5,999,656 | A | * | 12/1999 | Zandi et al. | 382/248 |
| 6,091,777 | A | * | 7/2000 | Guetz et al. | 375/240.11 |
| 6,898,323 | B2 | * | 5/2005 | Schwartz et al. | 382/240 |
| 6,898,325 | B2 | * | 5/2005 | Gormish | 382/248 |
| 7,072,520 | B2 | * | 7/2006 | Schwartz et al. | 382/251 |

FOREIGN PATENT DOCUMENTS

| JP | 2001-258034 | 9/2001 |
| JP | 2002-91943 | 3/2002 |
| JP | 2002-304624 | 10/2002 |
| JP | 2003-23632 | 1/2003 |
| JP | 2004-56632 | 2/2004 |
| JP | 2004-135070 | 4/2004 |
| JP | 2004-336404 | 11/2004 |
| JP | 2005-94212 | 4/2005 |

OTHER PUBLICATIONS

Wim Sweldens, "The Lifting Scheme: A Custom-Design Construction of Biorthogonal Wavelets," Applied and Computational Harmonic Analysis, vol. 3, No. 2, Article No. 0015, 1996, pp. 186-200.

* cited by examiner

*Primary Examiner* — Jose L Couso
(74) *Attorney, Agent, or Firm* — Oblon, Spivak, McClelland, Maier & Neustadt, L.L.P.

(57) ABSTRACT

An image processing apparatus includes an input unit that inputs image data; and an analysis filtering unit that generates coefficient data of a plurality of subbands by performing analysis filtering of the image data input by the input unit for each predetermined number of lines from an upper-end line to a lower-end line such that analysis filtering of a lower-end line of the current picture is completed before analysis filtering of an upper-end line of the next picture starts.

17 Claims, 21 Drawing Sheets

INPUT IMAGE LINE

HALFWAY CALCULATION BUFFER

DIVISION LEVEL=1   DIVISION LEVEL=2

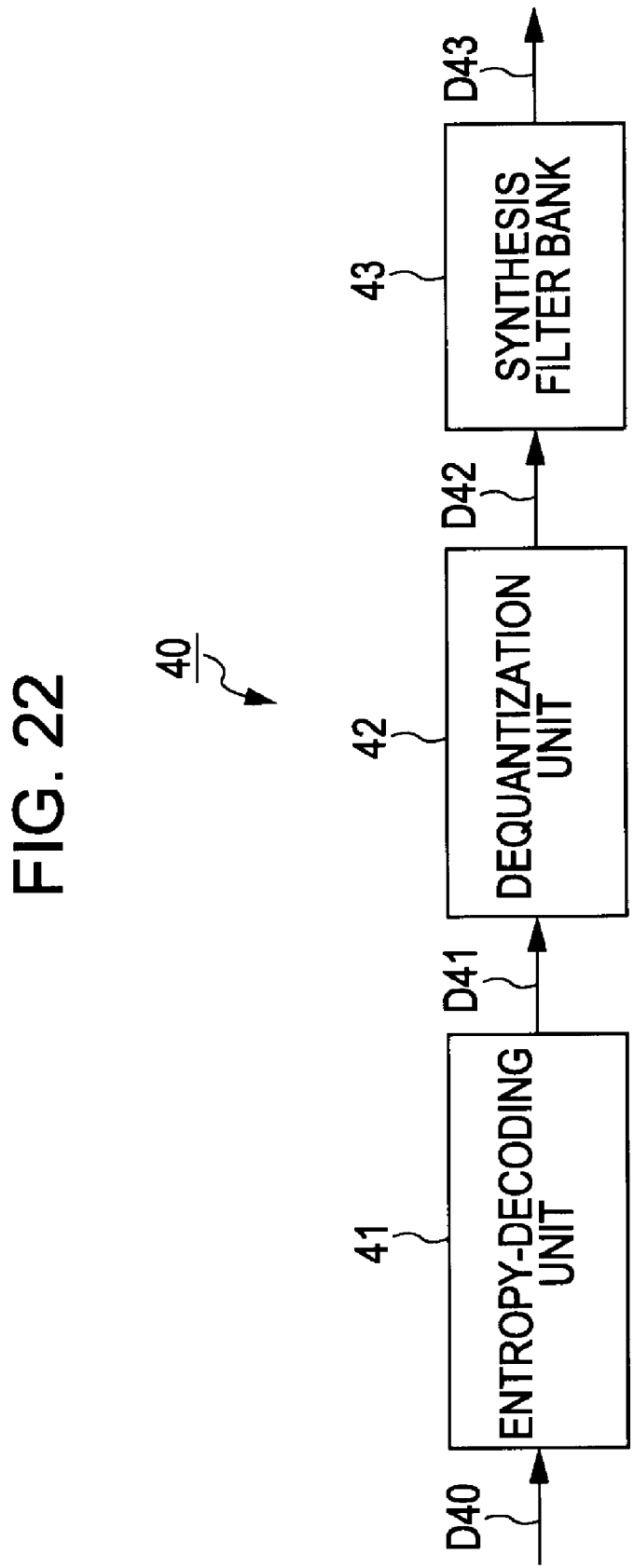

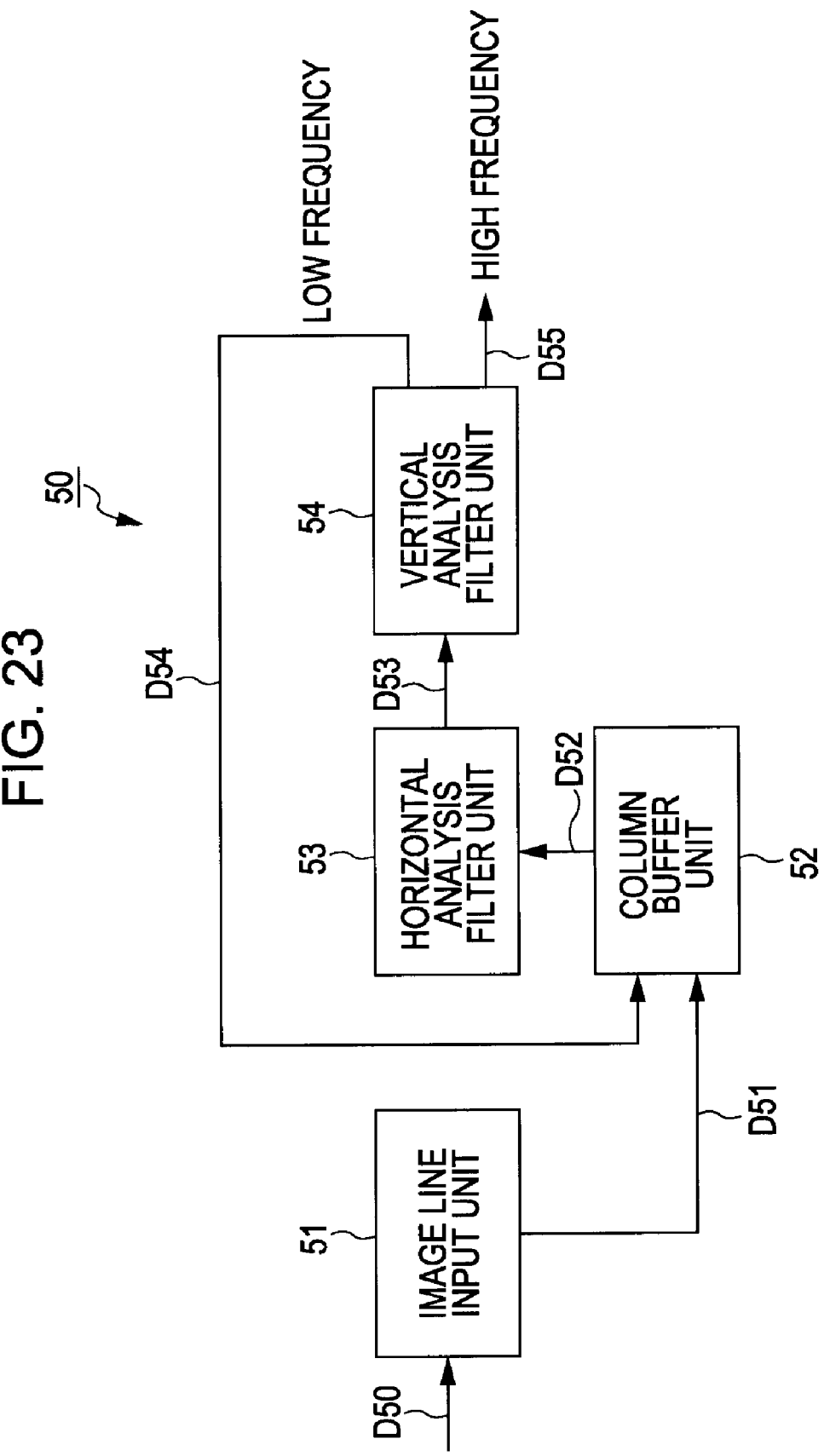

IMAGE PROCESSING APPARATUS AND IMAGE PROCESSING METHOD

CROSS REFERENCES TO RELATED APPLICATIONS

The present invention contains subject matter related to Japanese Patent Application JP 2006-136876 filed in the Japanese Patent Office on May 16, 2006, the entire contents of which are incorporated herein by reference.

BACKGROUND OF THE INVENTION

1. Field of the Invention

The present invention relates to a band analysis apparatus and method for performing, using a filter bank, band analysis of each of a plurality of pictures forming a moving image and dividing each of the pictures into a plurality of subbands, to a band synthesis apparatus and method for performing, using a filter bank, band synthesis of each of a plurality of pictures divided into a plurality of subbands, to an image encoding apparatus and method for performing, using a filter bank, band analysis of each of a plurality of pictures forming a moving image and encoding each of the pictures that has been subjected to band analysis to generate an encoded code-stream, to an image decoding apparatus and method for decoding an encoded code-stream and performing, using a filter bank, band synthesis of the decoded code-stream to reconstruct a moving image, to a program, and to a recording medium.

2. Description of the Related Art

As a typical method for compressing images, a Joint Photographic Experts Group (JPEG) method, which is standardized by the International Organization for Standardization (ISO), is available. The JPEG method uses discrete cosine transform (DCT) and provides excellent encoded images and decoded images at a relatively high bit rate. However, when the encoding bit rate is reduced to a predetermined value or less, block noise, which is specific to DCT transform, is significantly increased. Thus, deterioration becomes conspicuous from a subjective point of view.

In recent years, research and development of methods for dividing an image into a plurality of subbands using a filter bank, which is a combination of a low-pass filter and a high-pass filter, and performing encoding of each of the plurality of subbands has been actively conducted. In such circumstances, wavelet-transform encoding has been regarded as a new promising technique that will take the place of DCT transform since wavelet-transform encoding does not have a disadvantage that block noise becomes conspicuous at high compression, unlike DCT transform.

The JPEG 2000, for which international standardization was completed in January 2001, adopts a method in which the above-mentioned wavelet transform and high-efficiency entropy coding (bit modeling and arithmetic coding for each bit-plane) are combined together. The JPEG 2000 achieves a significant improvement in encoding efficiency, compared with any other JPEG method.

For example, a technique described in Japanese Unexamined Patent Application Publication No. 2001-197499 has been suggested.

SUMMARY OF THE INVENTION

Basically, the JPEG 2000 is a standard for encoding static images. Application of the JPEG-2000 technology to satellite images, map images, images for identification photographs, and the like has been expected. The Motion JPEG 2000, which encodes each of a plurality of pictures forming a moving image in accordance with the JPEG 2000, has been standardized as Part3 of the JPEG 2000 standard.

However, in order to encode moving images, such as video signals, using the JPEG 2000 technique, it is necessary to encode each of a plurality of continuously input pictures in real time. In particular, in wavelet transform used in the JPEG 2000, in order to improve compression efficiency, subband division of each of a plurality of pictures is generally performed until a desired division level is reached. Thus, it is necessary to complete analysis filtering of the current picture at the final division level before the next picture is input.

Not only the JPEG 2000 method but also other image compression methods for dividing each of a plurality pictures forming a moving image into a plurality of subbands in accordance with wavelet transform and performing encoding of each of the plurality of subbands are performed taking into consideration the above-mentioned condition.

For dedicated hardware, this condition can be satisfied by increasing the number of processing clocks of the hardware to increase the operation speed of wavelet transform. However, increasing the number of processing clocks causes an increase in power consumption. In addition, since the number of processing clocks of programmable hardware, such as a field programmable gate array (FPGA) or a programmable logic device (PLD), is small, such programmable hardware does not satisfy the condition.

Accordingly, it is desirable to provide a band analysis apparatus and method for performing wavelet transform of a moving image signal in real time, a band synthesis apparatus and method for performing inverse wavelet transform of a moving image in real time, an image encoding apparatus and method for performing encoding while performing wavelet transform of a moving image signal in real time, an image decoding apparatus and method for performing decoding while performing inverse wavelet transform of a moving image signal in real time, a program, and a recording medium.

An image processing apparatus according to an embodiment of the present invention includes input means for inputting image data; and analysis filtering means for generating coefficient data of a plurality of subbands by performing analysis filtering of the image data input by the input means for each predetermined number of lines from an upper-end line to a lower-end line such that analysis filtering of a lower-end line of the current picture is completed before analysis filtering of an upper-end line of the next picture starts.

An image processing apparatus according to another embodiment of the present invention includes input means for inputting coefficient data generated by performing filtering of image data for each predetermined number of lines from an upper-end line to a lower-end line; and synthesis filtering means for generating the image data by performing vertical and horizontal synthesis filtering of the coefficient data input by the input means for each predetermined number of lines from an upper-end line to a lower-end line of each of a plurality of subbands such that synthesis filtering of a lower-end line of the current picture is completed before synthesis filtering of an upper-end line of the next picture starts.

Accordingly, since wavelet transform or inverse wavelet transform of the current picture is completed before wavelet transform or inverse wavelet transform of the next picture starts, wavelet transform or inverse wavelet transform of a moving image signal can be performed in real time.

BRIEF DESCRIPTION OF THE DRAWINGS

FIG. 22 schematically shows a configuration of an image decoding apparatus according to a fourth embodiment; and FIG. 23 shows another configuration of the band analysis apparatus.

DESCRIPTION OF THE PREFERRED EMBODIMENTS

Embodiments of the present invention will be described with reference to the drawings.

First Embodiment

A band analysis apparatus according to a first embodiment that performs, using an analysis filter bank, band analysis of an input video signal to divide the video signal into a plurality of subbands will be described.

Figure 1:
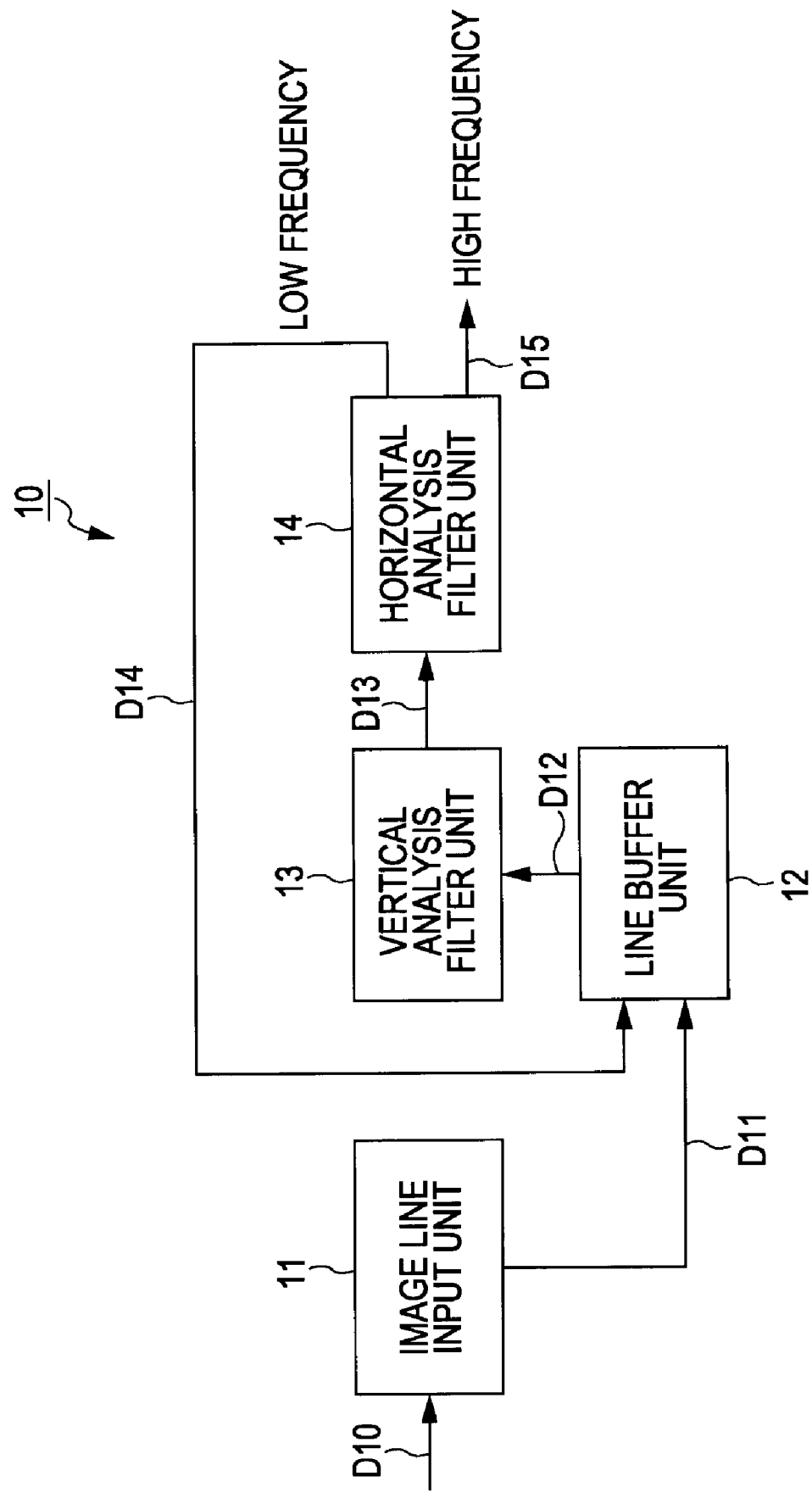
FIG. 1 schematically shows a configuration of a band analysis apparatus according to a first embodiment.

FIG. 1 schematically shows a configuration of a band analysis apparatus 10 according to the first embodiment.

Referring to FIG. 1, the band analysis apparatus 10 includes an image line input unit 11, a line buffer unit 12, a vertical analysis filter unit 13, and a horizontal analysis filter unit 14.

The image line input unit 11 receives a video signal D10 for each line, and supplies a data stream D11 for the image line to the line buffer unit 12.

Video signals are normally defined by a standard. For example, currently, television broadcasting is performed in accordance with a National Television Standards Committee (NTSC) system. In addition, a high definition television (HDTV) system is standardized as a standard number "SMPTE 274M" by the Society of Motion Picture and Television Engineers (SMPTE), which is a standard-setting organization in the United States. In the description below, the HDTV system (a resolution of 1920×1080) will be described as an example.

Figure 2:
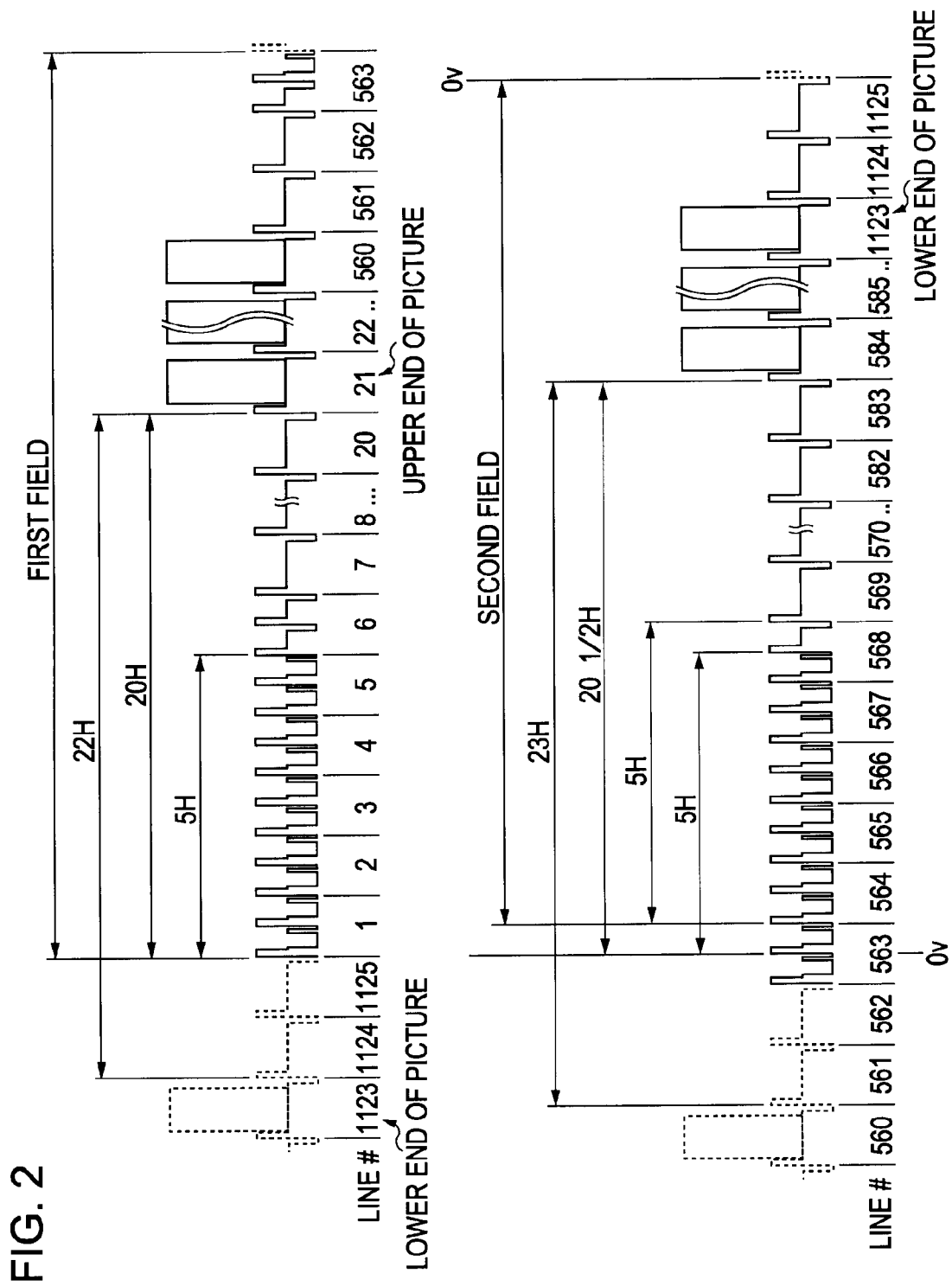
FIG. 2 includes signal distribution diagrams showing an interlace signal from among signals based on the SMPTE 274M standard and shows a position where a vertical blank signal is inserted.

FIG. 2 includes signal distribution diagrams showing an interlace signal from among signals based on the SMPTE 274M standard of the HDTV system. Referring to FIG. 2, an upper diagram shows a first field and a lower diagram shows a second field. An actual signal in the first field is located in an area from the 21st line to the 560th line (560−21+1=540 (lines)), the area being disposed subsequent to a vertical blank signal (V_BLK1) for 22 lines shown as "22H" in FIG. 2. An actual signal in the second field is located in an area from the 584th line to the 1123rd line (1123−584+1=540 (lines)), the area being disposed subsequent to a vertical blank signal (V_BLK2) for 23 lines shown as "23H" in FIG. 2.

Figure 3:
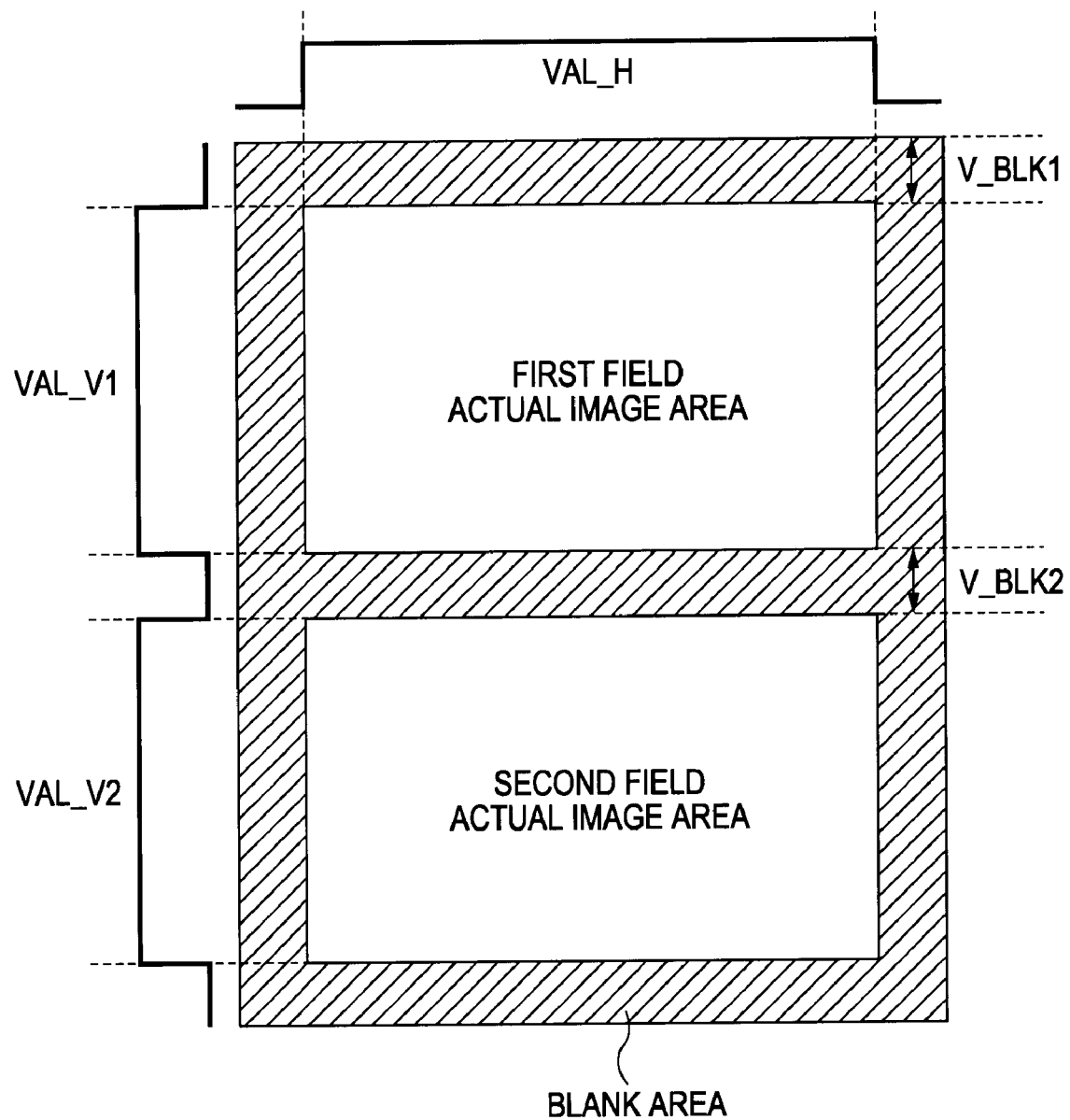
FIG. 3 shows an actual image area in a first field, an actual image area in a second field, and blank areas.

As described above, concerning a video signal, vertical blank signals are disposed before and after actual data. FIG. 3 shows an actual image area of the first field, an actual image area of the second field, and blank areas. The above-mentioned vertical blank signals V_BLK1 and V_BLK2 are also shown in FIG. 3.

Since the band analysis apparatus 10 performs wavelet transform in units of pictures (fields/frames) forming a video signal, it is necessary to detect an end point of a picture and to reset an operation of analysis filtering. Thus, the image line input unit 11 detects the end point of the picture by detecting a vertical blank signal for the video signal.

Figure 4:
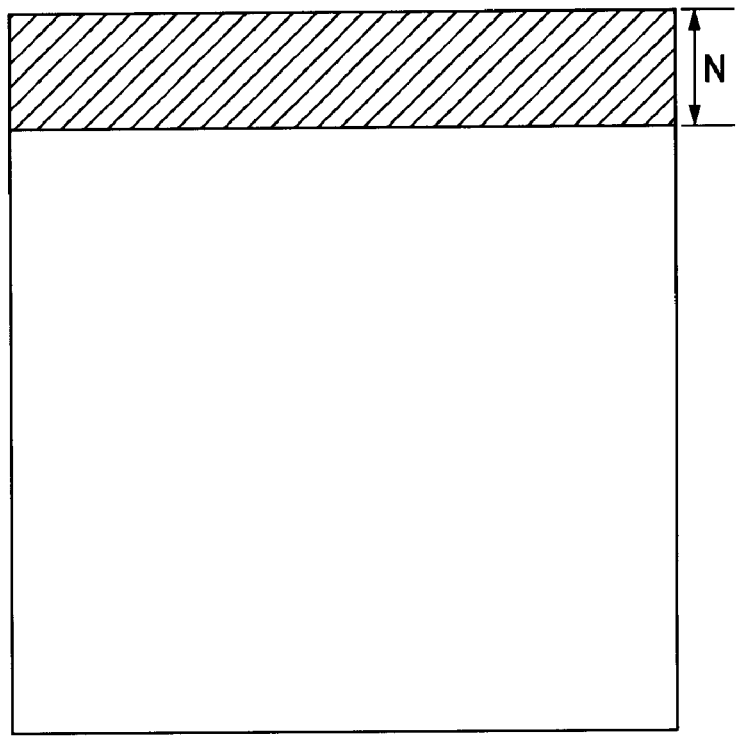
FIG. 4 illustrates buffering performed for each N lines.

The line buffer unit 12 stores and holds data streams D11 for individual lines. The line buffer unit 12 continues to store and hold data streams D11 until data streams D11 for the number of lines (N lines) necessary for vertical filtering are stored, as shown in FIG. 4.

Figure 5:
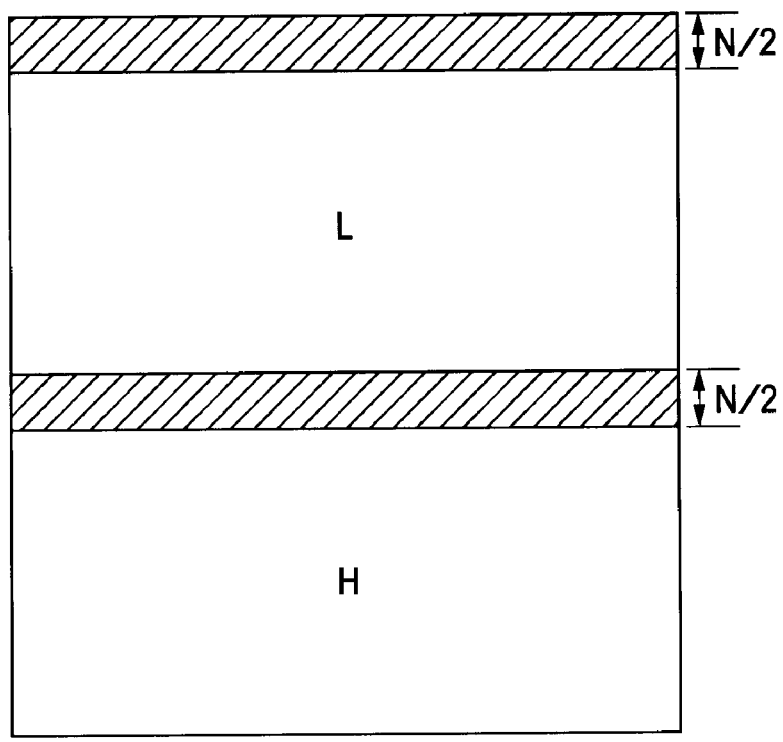
FIG. 5 illustrates vertical filtering in analysis filtering at division level 1.

The vertical analysis filter unit 13 sequentially reads line data D12 for N lines, and performs vertical low-pass analysis filtering and vertical high-pass analysis filtering. Due to the vertical filtering, a low-frequency component (L) and a high-frequency component (H) D13, which are obtained by vertical division, are generated, as shown in FIG. 5.

Figure 6:
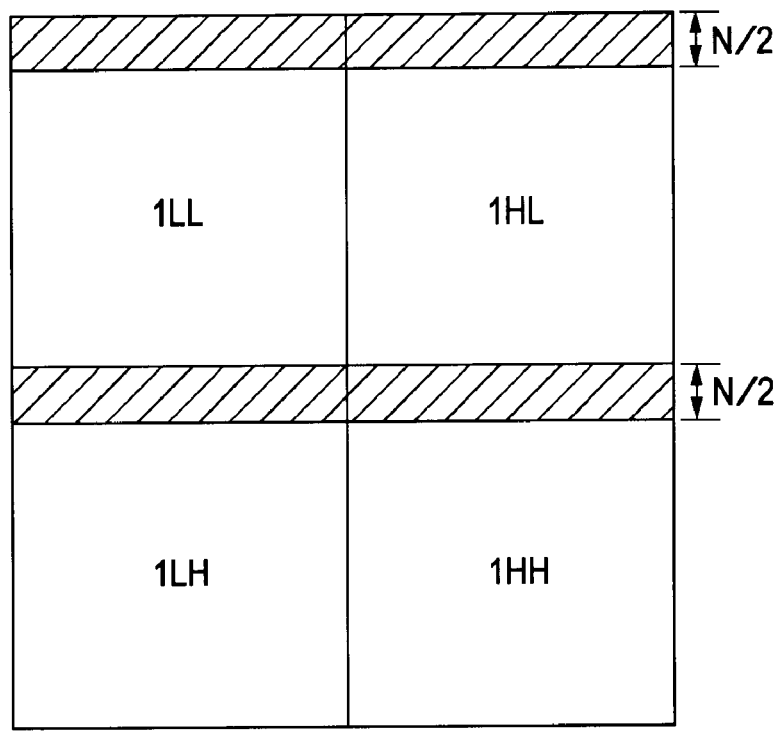
FIG. 6 illustrates horizontal filtering in analysis filtering at division level 1.

Immediately after the number of samples in a horizontal direction of low-frequency and high-frequency components D13 reaches M necessary for horizontal filtering, the horizontal analysis filter unit 14 performs horizontal low-pass analysis filtering and horizontal high-pass analysis filtering. Due to the horizontal filtering, a low-frequency component (1LL) D14 and high-frequency components (1HL, 1LH, and 1HH) D15, which are obtained by horizontal division, are generated, as shown in FIG. 6. Concerning the order of letters "L" and "H" in FIG. 6, the first letter indicates a band obtained after horizontal filtering is performed, and the last letter indicates a band obtained after vertical filtering is performed. In addition, the numeral disposed before the letter "L" or "H" indicates division level.

As a result of analysis filtering at division level 1, the horizontal analysis filter unit 14 generates the low-frequency component (1LL) D14 and the high-frequency components (1HL, 1LH, and 1HH) D15, as described above.

In wavelet transform, normally, a low-frequency component is hierarchically divided until a desired division level is reached. Thus, in the first embodiment, the low-frequency component (1LL) D14 is supplied to the line buffer unit 12 so as to be further divided by an analysis filter bank. Immediately after the number of lines necessary for vertical analysis filtering is buffered in the line buffer unit 12, analysis filtering at division level 2 is performed. A low-frequency component is repeatedly divided as described above since most of the energy of an image signal is concentrated in the low-frequency component.

Figure 7:
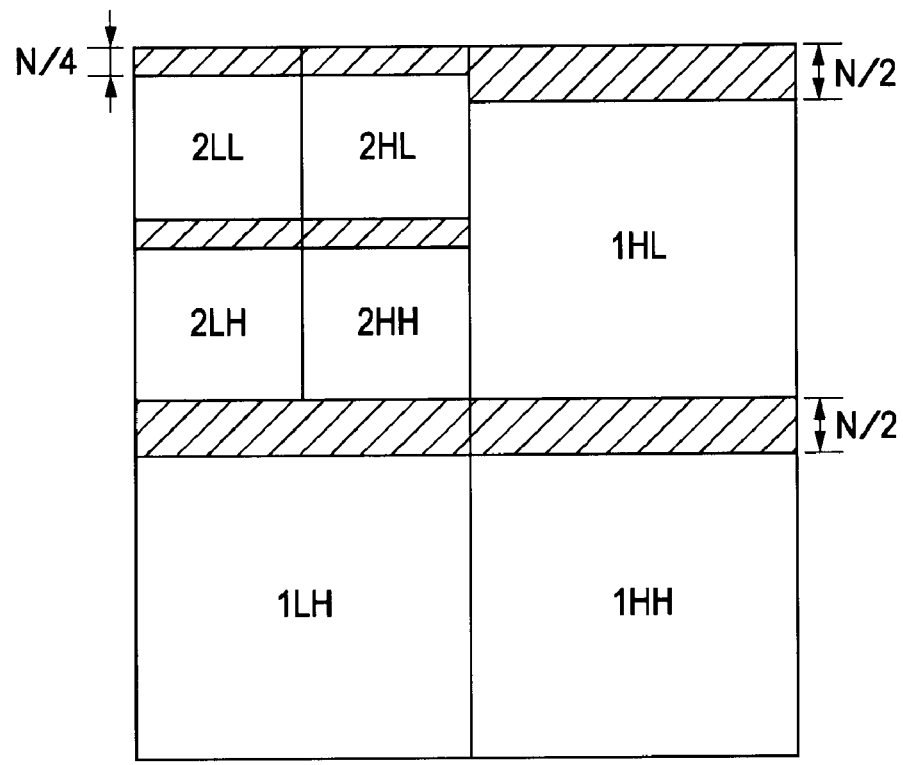
FIG. 7 shows a result obtained by performing analysis filtering until division level 2.

In the analysis filtering at division level 2, the vertical analysis filter unit 13 sequentially reads line data D12 for N/2 lines, and performs vertical low-pass analysis filtering and vertical high-pass analysis filtering, as shown in FIG. 6. Then, immediately after the number of samples in the horizontal direction of low-frequency and high-frequency components D13 reaches M, the horizontal analysis filter unit 14 performs horizontal low-pass analysis filtering and horizontal high-pass analysis filtering. Due to the horizontal filtering, a low-frequency component (2LL) and high-frequency components (2HL, 2LH, and 2HH) are generated, as shown in FIG. 7. Referring to FIG. 7, a subband 1LL obtained at division level 1 is divided into four subbands, 2LL, 2HL, 2LH, and 2HH, and seven subbands are obtained in total.

Figure 8:
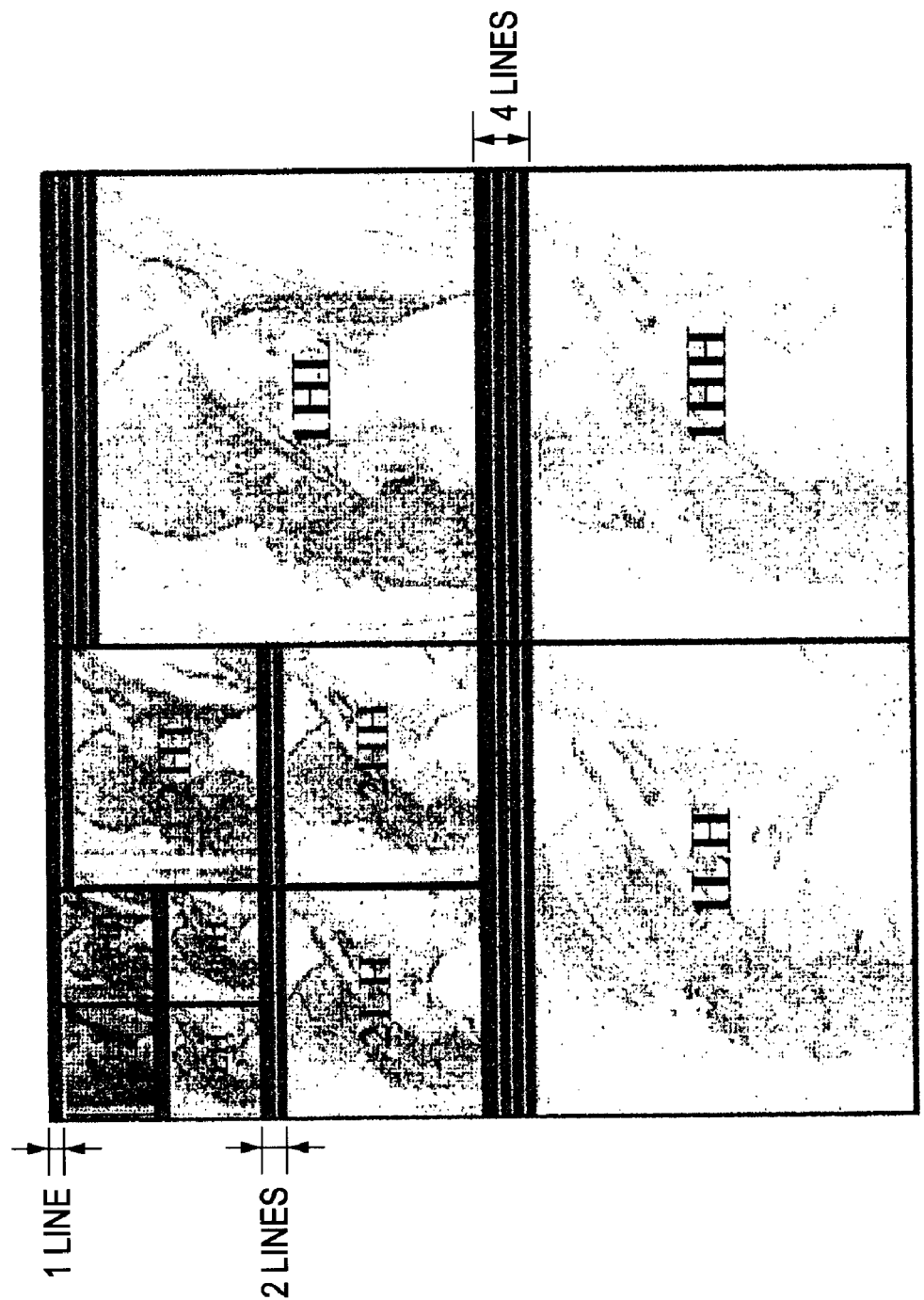
FIG. 8 shows a result obtained by performing analysis filtering for an actual image until division level 3.

In order to further increase the division level, analysis filtering can be repeatedly performed for a low-frequency component. FIG. 8 shows an example in which subband division by analysis filtering is performed for an actual image until division level 3.

The number N of lines of each of subbands stored and held in the line buffer unit 12 becomes twice every time the division level is decreased by 1. Thus, as shown in FIG. 8, when the number of lines of a subband at division level 3 is 1, a subband at division level 2 has two lines and a subband at division level 1 has four lines. This is based on the principle of wavelet transform.

As the most general arithmetic method of the above-mentioned analysis filtering, a method called convolutional operation is available. The convolutional operation is the most fundamental procedure for achieving a digital filter. As the convolutional operation, convolution multiplication of a filter tap coefficient by actual input data is performed. However, the convolutional operation generates a problem in which the calculation load increases as the tap length increases.

As a technique for solving the above-mentioned problem, a lifting technique for wavelet transform described in W. Sweldens, "The Lifting Scheme: A Custom-design Construction of Biorthogonal Wavelets", Appl. Comput. Harmon. Anal., vol. 3, no. 2, pp. 186-200, 1996 is known.

Figure 9:
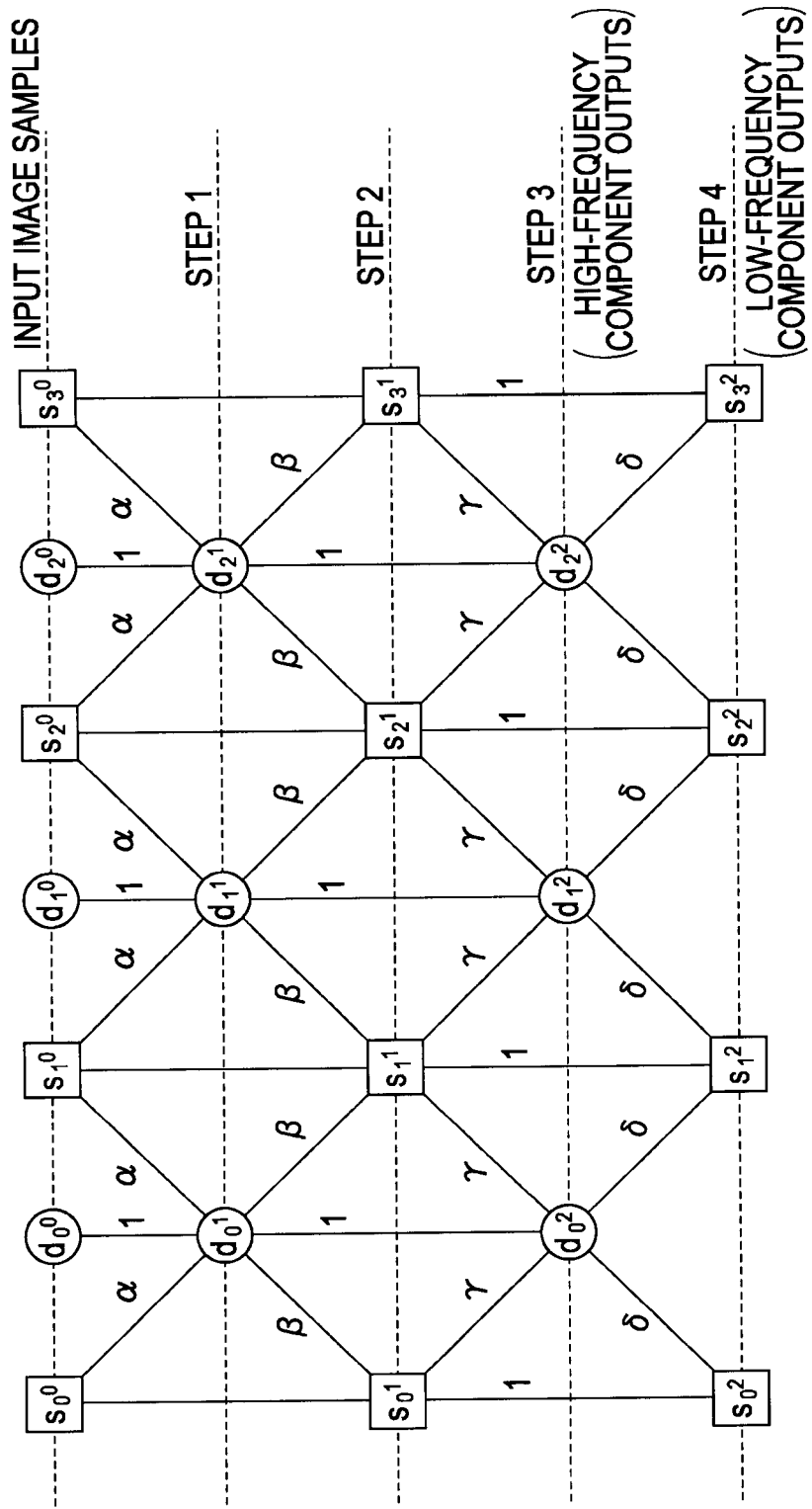
FIG. 9 shows a lifting structure of a 9×7-analysis filter.

FIG. 9 shows a lifting structure of a 9×7-analysis filter, which is adopted in the JPEG 2000 standard. Analysis filtering in which the lifting technique is applied to the 9×7-analysis filter will be schematically explained with reference to FIG. 9.

Referring to FIG. 9, input image samples are shown in the first row from the top (that is, the top row), and components generated by processing of steps S1 and S2 are shown in the second row from the top and the third row from the top, respectively. In addition, high-frequency component outputs generated by processing of step S3 are shown in the fourth row from the top, and low-frequency component outputs generated by processing of step S4 are shown in the fifth row from the top (that is, the bottom row). Input image samples are not necessarily shown in the first row. Coefficients obtained by the above-mentioned analysis filtering may be shown in the first row. In this embodiment, input image samples are shown in the first row. Even-numbered samples or lines are represented as squares, and odd-numbered samples or lines are represented as circles.

Due to analysis filtering in which the lifting technique is applied to the 9×7-analysis filter, high-frequency components are obtained by the processing of step S3 and low-frequency components are obtained by the processing of step S4. The processing of steps S1 to S4 is expressed using the following equations:

Step S1: $d_i^1 = d_i^0 + \alpha(s_i^0 + s_{i+1}^0)$

Step S2: $s_i^1 = s_i^0 + \beta(d_{i-1}^1 + d_i^1)$

Step S3: $d_i^2 = d_i^1 + \gamma(s_i^1 + s_{i+1}^1)$

Step S4: $s_i^2 = s_i^1 + \delta(d_{i-1}^2 + d_i^2)$

Since analysis at a division level can be performed by analysis filtering using the lifting structure shown in FIG. 9, analysis filtering until a desired division level can be achieved by performing a plurality of steps of analysis filtering.

In the description below, for example, in a display device or the like, scanning is started from the pixel in the upper-left corner of the screen. When scanning from the leftmost pixel to the rightmost pixel in a line is completed, a line is formed. When scanning from the uppermost line to the lowest line is completed, a screen is formed.

Figure 10:
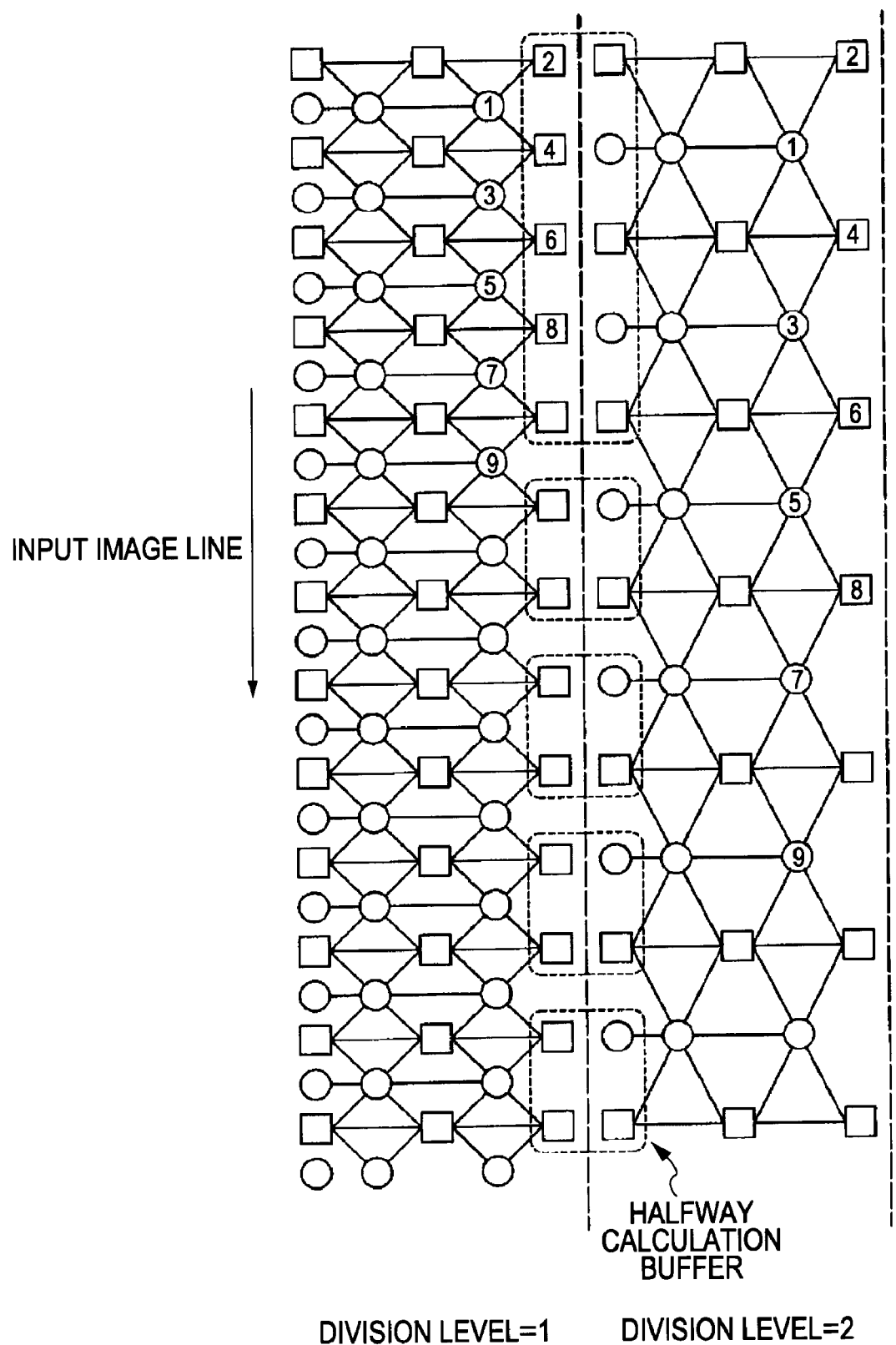
FIG. 10 shows an example in which analysis filtering in which a lifting technique is applied to the 9×7-analysis filter is performed until division level 2.

FIG. 10 shows an example in which analysis filtering in which the lifting technique is applied to the 9×7-analysis filter is performed until division level 2. Unlike FIG. 9, input image lines are shown in the longitudinal direction in FIG. 10. That is, in the analysis filtering, scanning of samples on the screen is vertically performed using a vertical analysis filter.

In the analysis filtering at division level 1, components are generated in the order of a high-frequency component (1), a low-frequency component (2), a high-frequency component (3), a low-frequency component (4), etc. in a direction from the top to the bottom in FIG. 10. In addition, in the analysis filtering at division level 2, components are generated in the order of a high-frequency component (1), a low-frequency component (2), a high-frequency component (3), a low-frequency component (4), etc. in the direction from the top to the bottom in FIG. 10. Although the analysis filtering at division level 2 is performed while the analysis filtering at division level 1 is performed, the explanation of this is omitted here.

As is clear from FIG. 10, a timing at which a high-frequency component or a low-frequency component is generated at division level 2 is delayed by a factor of two with respect to a timing at which a high-frequency component or a low-frequency component is generated at division level 1. This delay is a feature of analysis filtering using the lifting structure.

As described above, in wavelet transform, in general, subband division of a picture is performed until a desired division level is reached. However, a timing at which a high-frequency component or a low-frequency component is generated is delayed by a factor of two as the division level increases, as described above. Thus, when wavelet transform is performed for a video signal D10, wavelet transform of the current picture may not be completed within the vertical blank period shown in FIG. 2, and the next picture may be input before wavelet transform of the current picture is completed.

Figure 11:
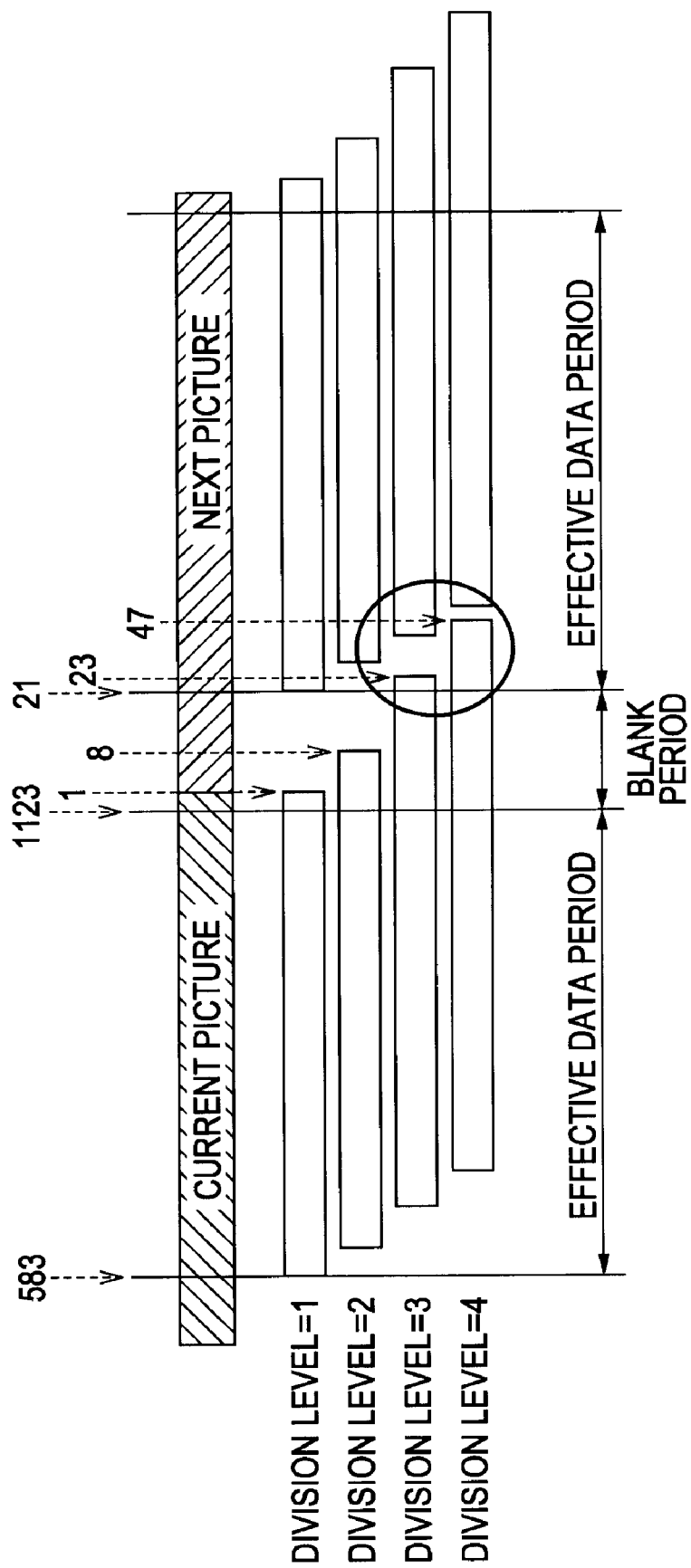
FIG. 11 shows an example of the related art in which wavelet transform of the current picture is not completed before the next picture is input.

FIG. 11 shows an example in which the next picture is input before wavelet transform of the current picture is completed.

FIG. 11 shows processing of wavelet transform from division level 1 to division level 4 in chronological order when wavelet transform is performed for the current picture and the next picture. Line numbers shown in FIG. 11 are the same as the line numbers used in accordance with the SMPTE 274M standard in FIG. 2. As shown in FIG. 11, analysis filtering of the current picture at division levels 3 and 4 is not completed by the time when analysis filtering of the next picture at division level 1 is performed.

Figure 12:
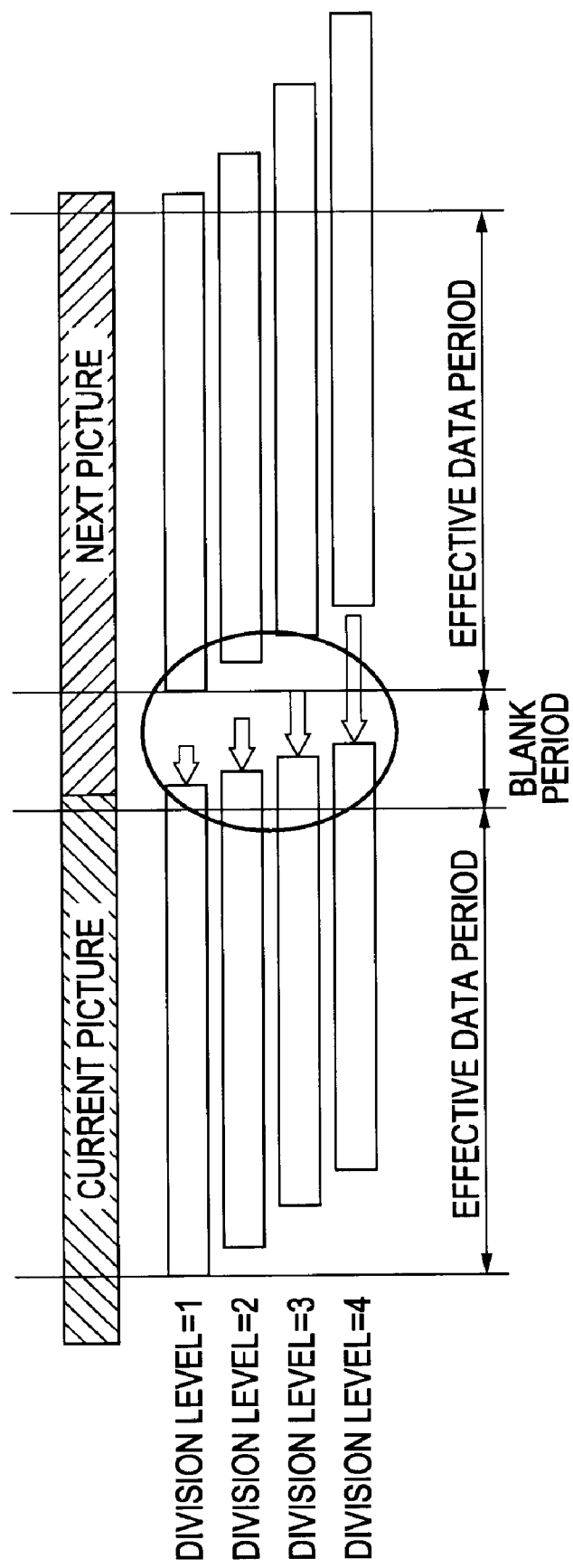
FIG. 12 shows an example of the first embodiment in which wavelet transform of the current picture is completed before the next picture is input by advancing the timing of analysis filtering of a lower-end line.

In order to solve the above-mentioned problem, in analysis filtering of the current picture at each division level, the band analysis apparatus 10 according to the first embodiment advances the timing of analysis filtering of a lower-end line, as shown in FIG. 12. Thus, analysis filtering of the current picture until division level 4 can be completed before analysis filtering of the next picture at division level 1 starts.

A method for advancing the timing of analysis filtering of a lower-end line of the current picture at each division level is described next.

Figure 13:
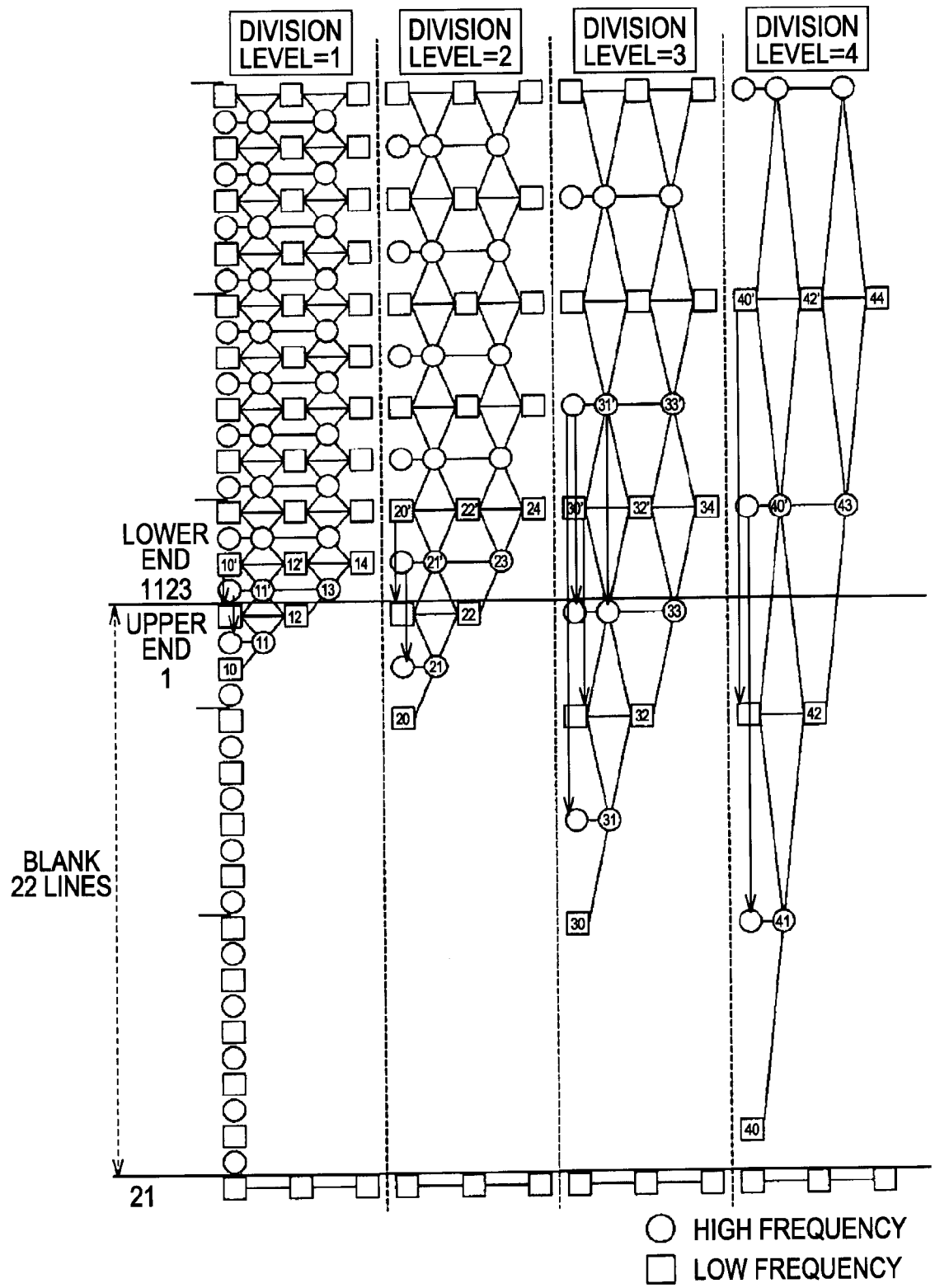
FIG. 13 shows the timing of analysis filtering of the lower-end line of the current picture in the related art.

FIG. 13 shows an example in which analysis filtering in which the lifting technique is applied to the 9×7-analysis filter is performed until division level 4, as in the example shown in FIG. 10. FIG. 13 shows the 1123rd line, which is the lower end of the current picture, a 22-line vertical blank signal disposed subsequent to the current picture, and samples of the next picture from the 21st line.

In analysis filtering of the lower-end line at division level 1, components (10), (11), and (12) are generated in that order, and then, a high-frequency component (13) and a low-frequency component (14) are generated, as shown in FIG. 13. Similarly, in analysis filtering of the lower-end line at division level 2, components (20), (21), and (22) are generated in that order, and then, a high-frequency component (23) and a low-frequency component (24) are generated, as shown in FIG. 13. In analysis filtering of the lower-end line at division level 3, components (30), (31), and (32) are generated in that order, and then, a high-frequency component (33) and a low-frequency component (34) are generated, as shown in FIG. 13. In analysis filtering of the lower-end line at division level 4, components (40), (41), and (42) are generated in that order, and then, a high-frequency component (43) and a low-frequency component (44) are generated, as shown in FIG. 13.

Arrows pointing from the current picture to pixels in the blank period indicate that samples are expanded symmetrically. "Symmetric expansion" means that a supplementary sample is provided from an image area to a portion where a sample does not actually exist by symmetric expansion when analysis filtering is performed at a boundary between pictures or subbands. Thus, the provided supplementary sample and the original sample are in a mirror-image relationship with respect to each other. As shown in FIG. 13, for example, a component (10') located in an area of the current picture is an original component with respect to a supplementary component (10) located in the blank period. Similarly, at division level 1, symmetrical expansion from a component (11') to a component (11), from a component (12') to a component (12), from a component (13') to a component (13), and from a component (14') to a component (14) is performed. The same applies to other division levels.

Although analysis filtering at division level 4 is completed within the blank period in FIG. 13, if analysis filtering is performed until division level 5, analysis filtering at division level 5 is not completed within the blank period. In addition, when the number of lines in the blank period is smaller, a similar problem occurs.

Figure 14:
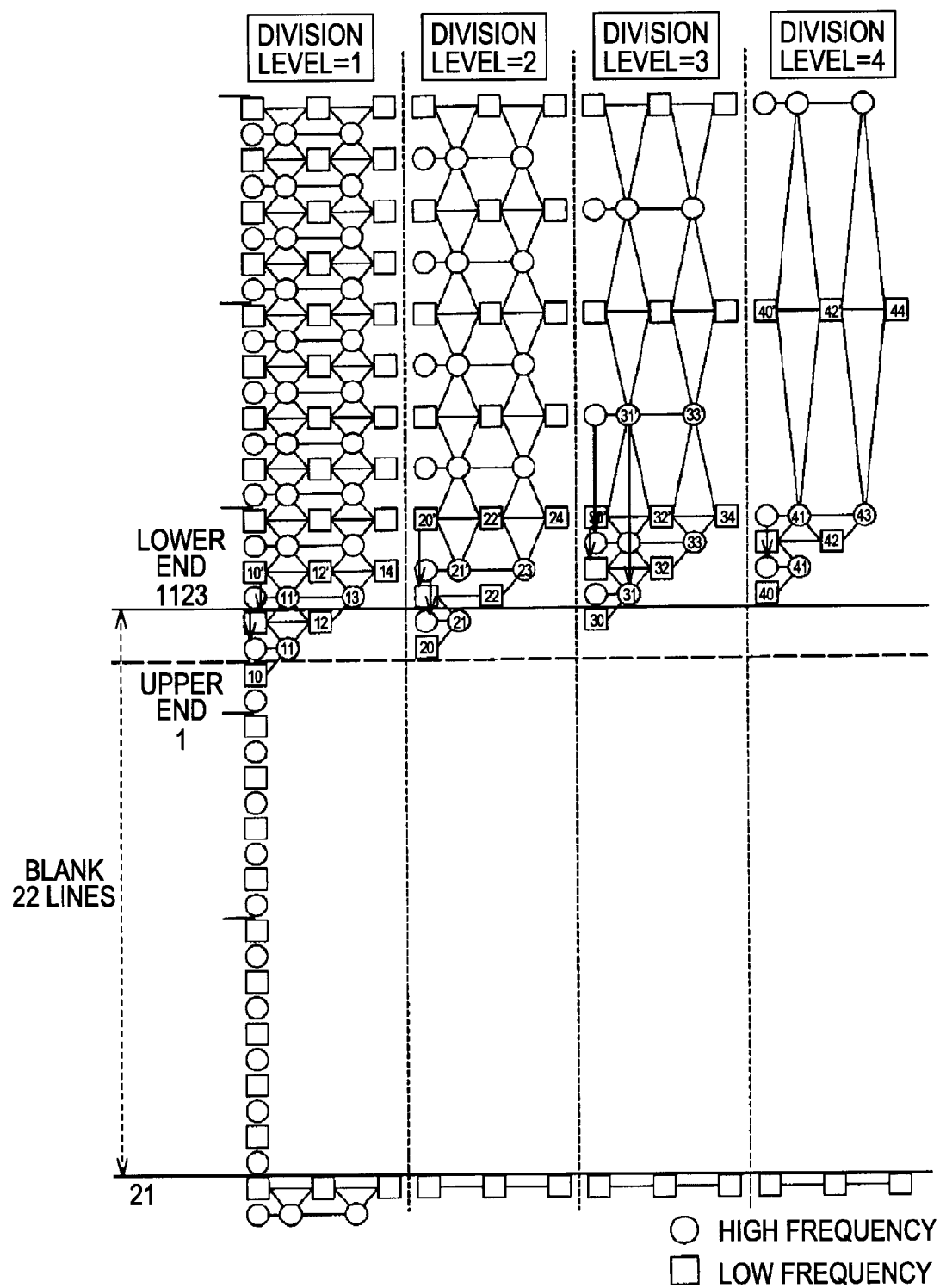
FIG. 14 shows the timing of analysis filtering of the lower-end line of the current picture in the first embodiment.

In order to solve the above-mentioned problem, the band analysis apparatus 10 according to the first embodiment advances the timing of symmetric expansion at the lower-end line, and thus advances the timing of analysis filtering of the lower-end line of the current picture. That is, as shown in FIG. 14, immediately after an original sample to be subjected to symmetric expansion for supplementation at the lower-end line of the current picture and the lower-end line of each subband of the current picture is generated, symmetric expansion processing is performed and analysis filtering at each division level is performed.

Accordingly, even when the number of division levels is larger, the band analysis apparatus 10 is capable of completing analysis filtering of the current picture until the final division level before starting analysis filtering of the upper-end line of the next picture.

Second Embodiment

An image encoding apparatus according to a second embodiment that compresses and encodes coefficient data generated by wavelet transform will be described.

Figure 15:
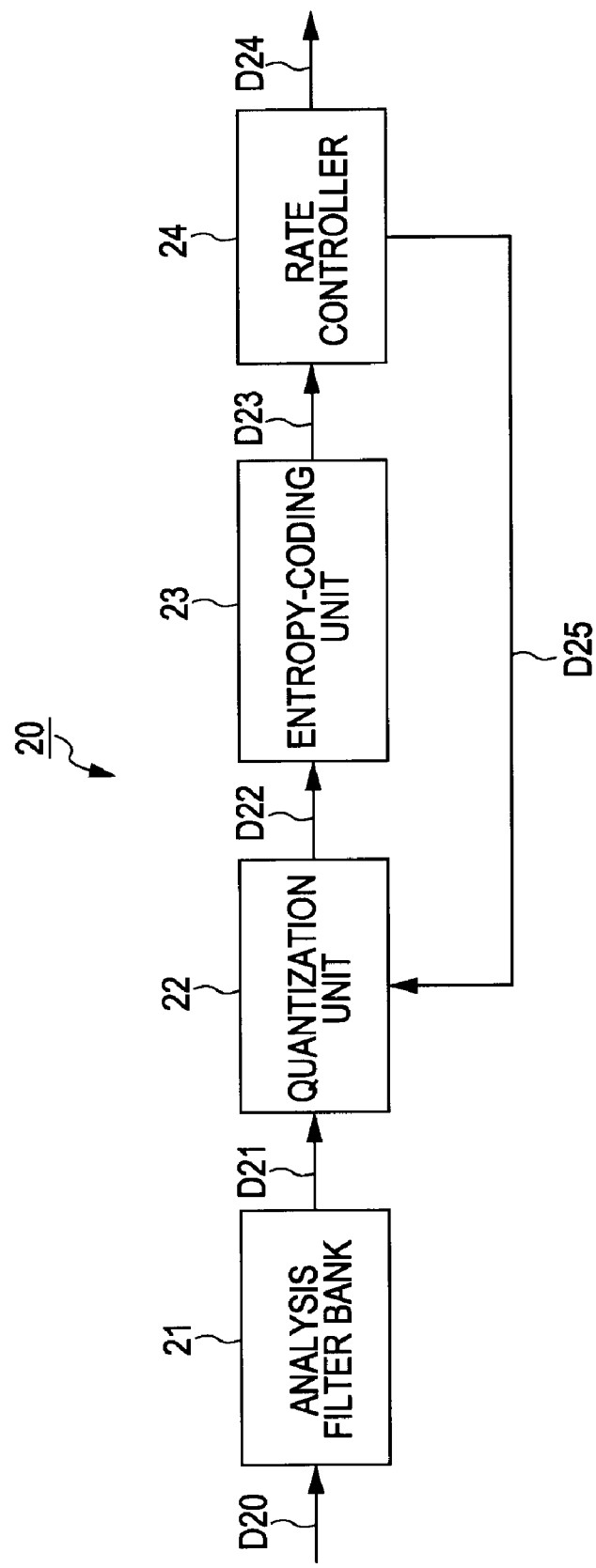
FIG. 15 schematically shows a configuration of an image encoding apparatus according to a second embodiment.

FIG. 15 schematically shows a configuration of an image encoding apparatus 20 according to the second embodiment. Referring to FIG. 15, the image encoding apparatus 20 includes an analysis filter bank 21, a quantization unit 22, an entropy-coding unit 23, and a rate controller 24.

The analysis filter bank 21 has a configuration similar to the band analysis apparatus 10 shown in FIG. 1. That is, the analysis filter bank 21 performs analysis filtering for an input video signal D20, and supplies coefficient data D21 obtained by analysis to the quantization unit 22. In particular, immediately after an original sample to be subjected to symmetric expansion for supplementation at the lower-end line of the current picture and the lower end of each subband of the current picture is generated, the analysis filter bank 21 performs symmetric expansion processing and performs analysis filtering at each division level. Thus, analysis filtering of the current picture until the final division level is completed before analysis filtering of the first line of the next picture starts.

The quantization unit 22 performs quantization by dividing the coefficient data D21 generated by the analysis filter bank 21 by, for example, a quantization step size, and generates quantized coefficient data D22.

The entropy-coding unit 23 performs source encoding of the quantized coefficient data D22 generated by the quantization unit 22, and generates a compressed encoded code-stream D23. As source encoding, for example, Huffman coding adopted in the JPEG and the Moving Picture Experts Group (MPEG) or high-precision arithmetic coding adopted in the JPEG 2000 can be used.

The rate controller 24 performs control so as to achieve a desired bit rate or compression rate. After performing rate control, the rate controller 24 outputs an encoded code-stream D24 whose rate has been controlled. For example, in order to achieve a higher bit rate, the rate controller 24 transmits to the quantization unit 22 a control signal D25 for decreasing the quantization step size. In contrast, in order to achieve a lower bit rate, the rate controller 24 transmits to the quantization unit 22 a control signal D25 for increasing the quantization step size.

Third Embodiment

A band synthesis apparatus according to a third embodiment that corresponds to the band analysis apparatus 10 according to the first embodiment will be described.

Figure 16:
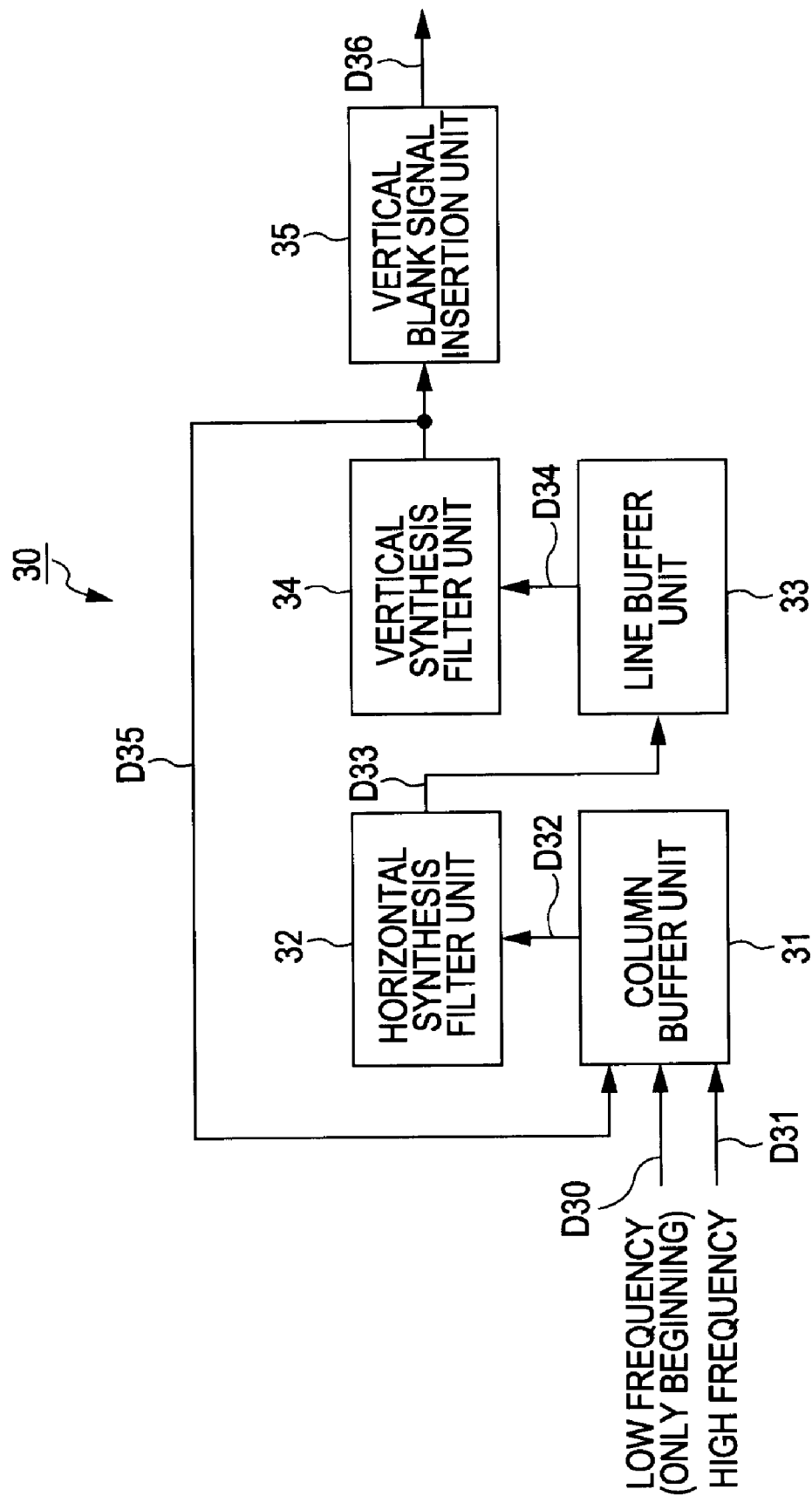
FIG. 16 schematically shows a configuration of a band synthesis apparatus according to a third embodiment.

FIG. 16 schematically shows a configuration of a band synthesis apparatus 30 according to the third embodiment. Referring to FIG. 16, the band synthesis apparatus 30 includes a column buffer unit 31, a horizontal synthesis filter unit 32, a line buffer unit 33, a vertical synthesis filter unit 34, and a vertical blank signal insertion unit 35.

The column buffer unit 31 stores and holds a low-frequency component D30 and a high-frequency component D31 for each column. The column buffer unit 31 continues to store and hold low-frequency components D30 and high-frequency components D31 until low-frequency components D30 and high-frequency components D31 for M samples are stored. A low-frequency component D30 only for a lowest-frequency subband is input to the column buffer unit 31. Then, low-frequency components D35 generated by synthesis filtering are supplied from the vertical synthesis filter unit 34.

The horizontal synthesis filter unit 32 sequentially reads column data D32 for M samples, and performs horizontal low-pass synthesis filtering and horizontal high-pass synthesis filtering. Due to the horizontal filtering, low-frequency and high-frequency components D33, which are obtained by horizontal synthesis, are generated.

The line buffer unit 33 stores and holds low-frequency and high-frequency components D33, which are obtained by horizontal synthesis, for individual lines, and continues to store and hold low-frequency and high-frequency components D33 until low-frequency and high-frequency components D33 for N lines are stored.

The vertical synthesis filter unit 34 sequentially reads line data D34 for N lines, and performs vertical low-pass synthesis filtering and vertical high-pass synthesis filtering. Due to the vertical filtering, a low-frequency component D35, which is obtained by vertical synthesis, is generated. The low-frequency component D35 is supplied to the column buffer unit 31, and stored and held in the column buffer unit 31 until synthesis filtering at the next division level is performed.

In inverse wavelet transform, synthesis filtering is performed in a direction, for example, from division level 4 to division level 1, which is opposite to the direction of wavelet transform. By repeatedly performing processing for generating a low-frequency signal at a division level lower by one than the previous level from the low-frequency component D35 and the high-frequency component D31, image data stream is generated. The generated image data stream is supplied to the vertical blank signal insertion unit 35.

As shown in FIG. 2, the vertical blank signal insertion unit 35 inserts a vertical blank signal into the image data stream at a predetermined timing, and outputs a generated video signal D36.

A lifting technique can also be applied to synthesis filtering. However, in synthesis filtering adopting a lifting structure, the timing at which a high-frequency component or a low-frequency component is generated is delayed by a factor of two as the division level increases. Thus, inverse wavelet transform of the current picture may not be completed within the vertical blank period shown in FIG. 2, and the next picture may be input before the inverse wavelet transform of the current picture is completed.

Figure 17:
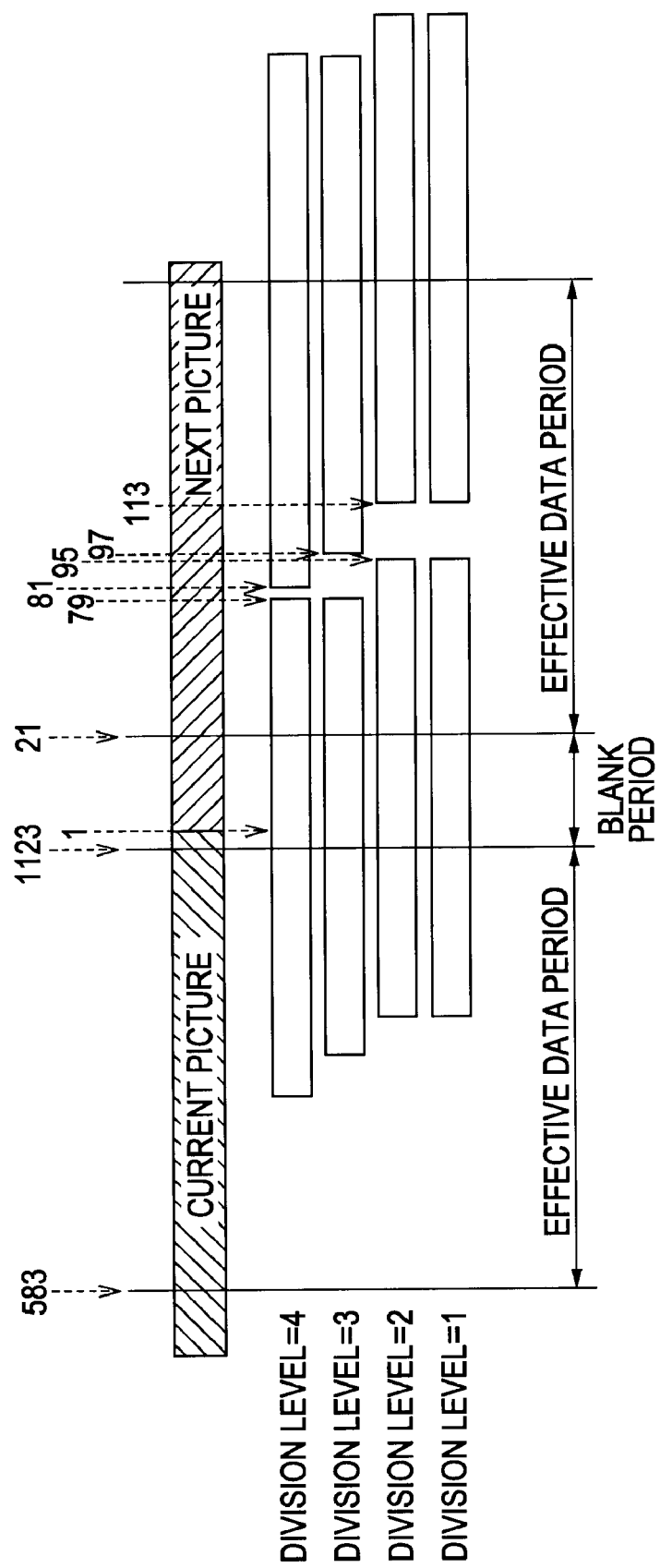
FIG. 17 shows an example of the related art in which inverse wavelet transform of the current picture is not completed before the next picture is input.

FIG. 17 shows an example in which the next picture is input before inverse wavelet transform of the current picture is completed. FIG. 17 shows processing of inverse wavelet transform from division level 4 to division level 1 in chronological order when inverse wavelet transform is performed for the current picture and the next picture. Line numbers shown in FIG. 17 are the same as the line numbers used in accordance with the SMPTE 274M standard in FIG. 2. As shown in FIG. 17, synthesis filtering of the current picture at division levels 2 and 1 is not completed by the time when synthesis filtering of the next picture at division level 4 is performed.

Figure 18:
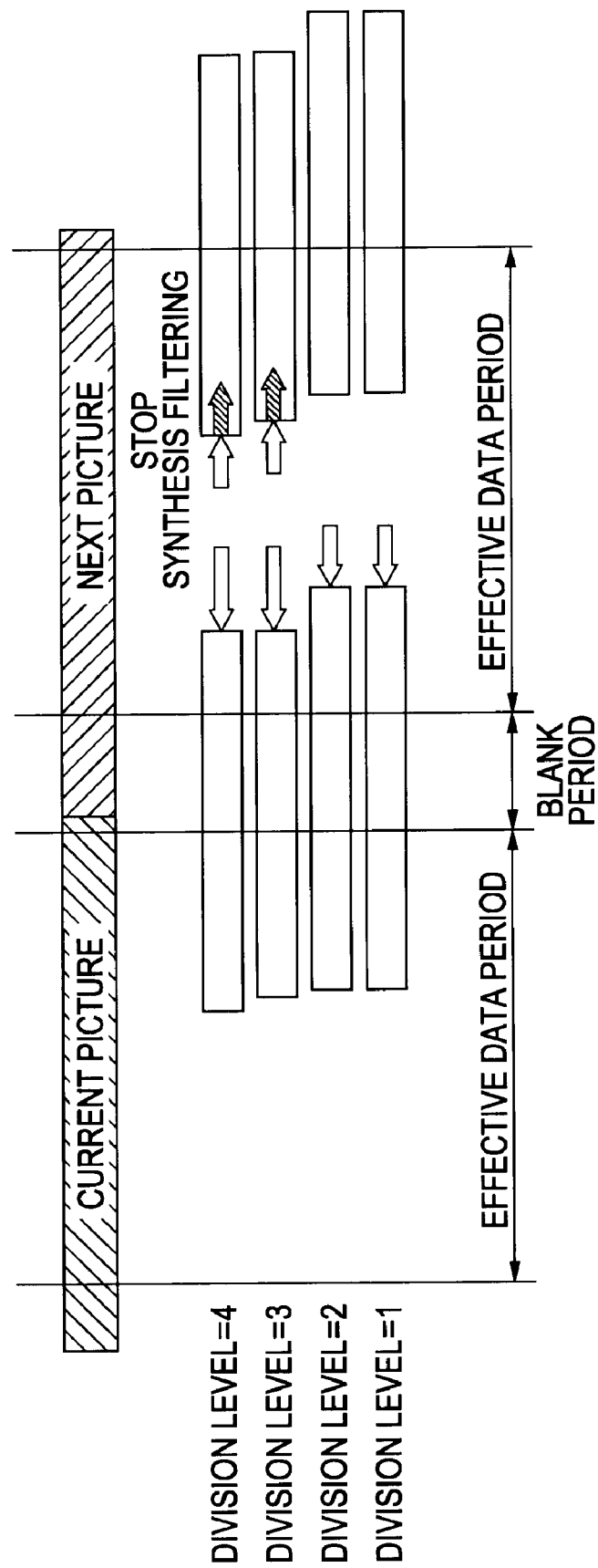
FIG. 18 shows an example of the third embodiment in which inverse wavelet transform of the current picture is completed before the next picture is input by advancing the timing of synthesis filtering of a lower-end line.

In order to solve the above-mentioned problem, the band synthesis apparatus 30 according to the third embodiment advances the timing of synthesis filtering of the lower-end line of the current picture at each division level, as shown in FIG. 18. Thus, synthesis filtering of the current picture until division level 1 can be completed before synthesis filtering of the next picture at division level 4 starts. In addition, as shown in FIG. 18, the timings of synthesis filtering of the next picture at predetermined one or more division levels (division levels 4 and 3) are delayed.

A method for advancing the timing of synthesis filtering of the lower-end line of the current picture at each division level is described next.

Figure 19:
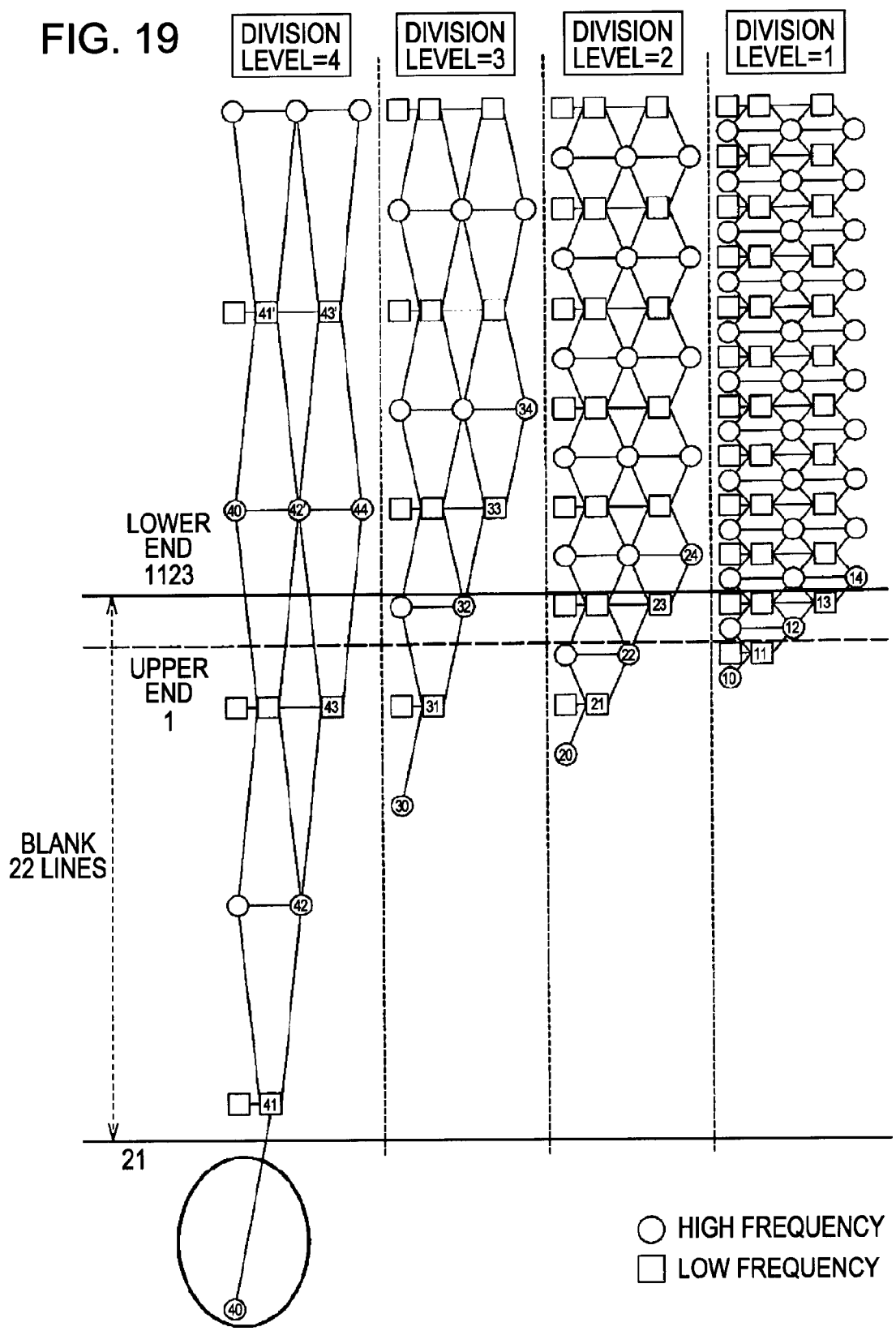
FIG. 19 shows the timing of synthesis filtering of the lower-end line of the current picture in the related art.

FIG. 19 shows an example in which synthesis filtering in which a lifting technique is applied to a 9×7-synthesis filter is performed from division level 4 to division level 1.

In synthesis filtering of the lower-end line at division level 4, components (40), (41), and (42) are generated in that order, and then, a high-frequency component (43) and a low-frequency component (44) are generated, as shown in FIG. 19. Similarly, in synthesis filtering of the lower-end line at division level 3, components (30), (31), and (32) are generated in that order, and then, a low-frequency component (33) and a high-frequency component (34) are generated, as shown in FIG. 19. In synthesis filtering of the lower-end line at division level 2, components (20), (21), and (22) are generated in that order, and then, a low-frequency component (23) and a high-frequency component (24) are generated, as shown in FIG. 19. In synthesis filtering of the lower-end line at division level 1, components (10), (11), and (12) are generated in that order, and then, a low-frequency component (13) and a high-frequency component (14) are generated, as shown in FIG. 19.

As shown in FIG. 19, synthesis filtering at division level 4 is not completed within the blank period. Thus, inverse wavelet transform of the current picture is not completed before the next picture is input.

Figure 20:
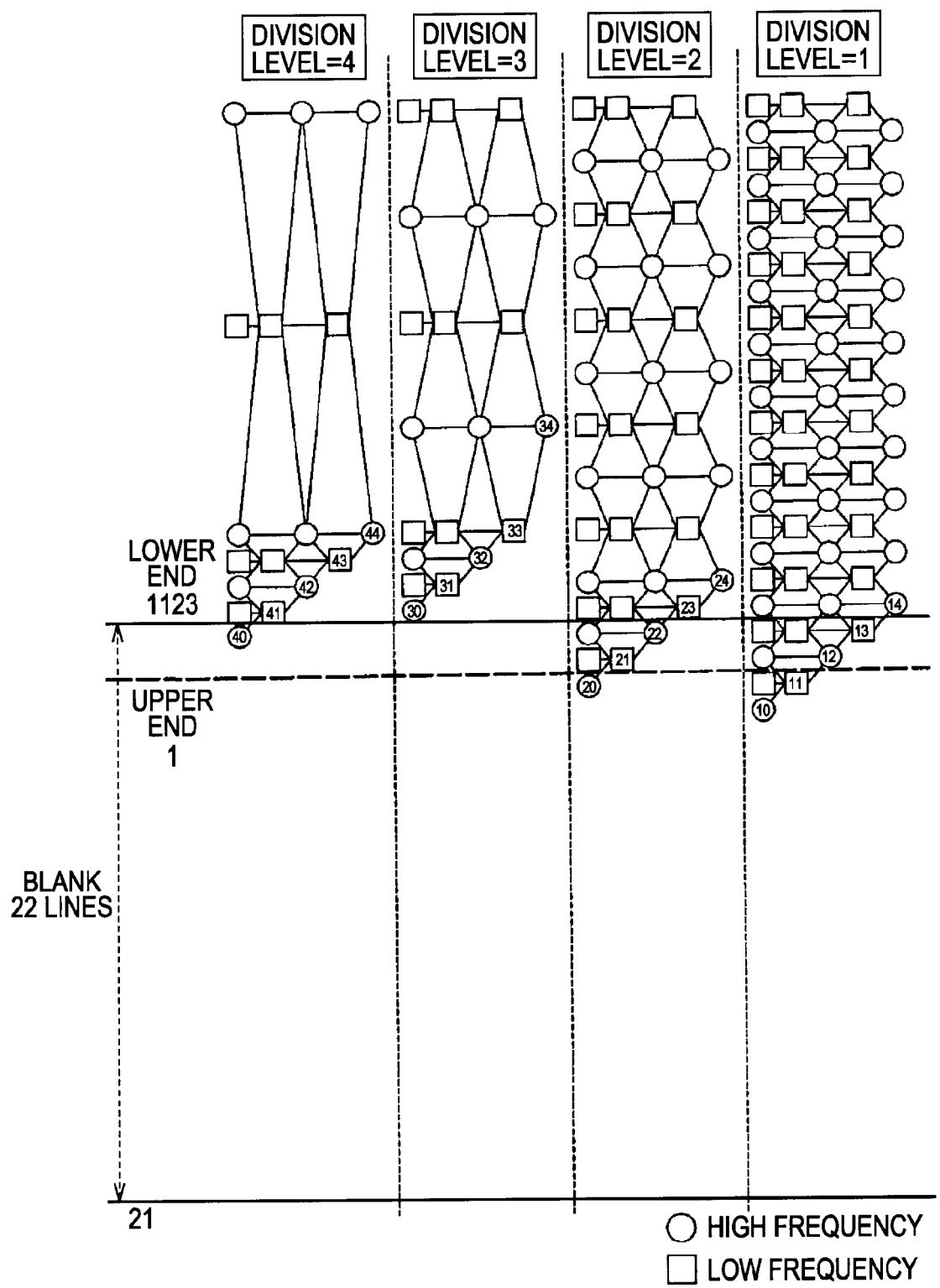
FIG. 20 shows the timing of synthesis filtering of the lower-end line of the current picture in the third embodiment.

In order to solve the above-mentioned problem, the band synthesis apparatus 30 according to the third embodiment advances the timing of symmetric expansion processing at the lower-end line, and thus advances the timing of synthesis filtering of the lower-end line of the current picture. That is, as shown in FIG. 20, immediately after an original sample to be subjected to symmetric expansion for supplementation at the lower-end line of each subband of the current picture is generated, the band synthesis apparatus 30 performs symmetric expansion processing and performs synthesis filtering at each division level.

Figure 21:
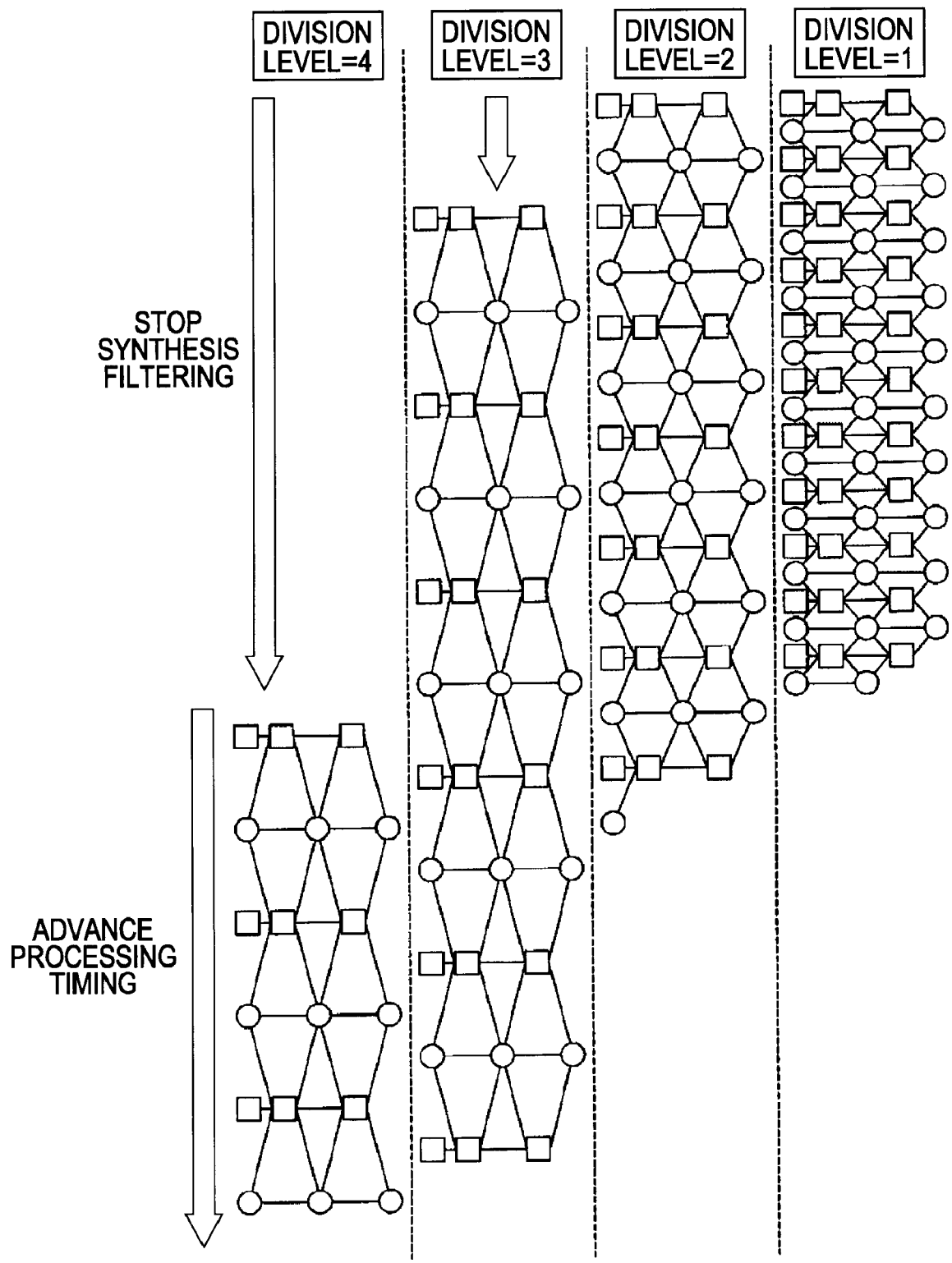
FIG. 21 shows an example in which the timings of synthesis filtering of the next picture at predetermined one or more division levels are delayed.

In addition, since the band synthesis apparatus 30 according to the third embodiment delays the timing of synthesis filtering of the next picture at predetermined one or more division levels, inverse wavelet transform of the current picture is prevented from temporally overlapping with inverse wavelet transform of the next picture, as shown in FIG. 18. That is, for example, by stopping synthesis filtering of one or more upper-end lines at division levels 4 and 3, temporal overlapping with inverse wavelet transform of the current picture is prevented, as shown in FIG. 21. Then, by advancing the timings of synthesis filtering processing including synthesis filtering of the above-mentioned one or more lines, temporal overlapping with the next picture is prevented.

Thus, even when the number of division levels is larger, the band synthesis apparatus 30 is capable of completing synthesis filtering of the current picture until division level 1 before starting synthesis filtering of the upper-end line of the next picture.

If temporal overlapping between inverse wavelet transform of the current picture and inverse wavelet transform of the next picture is prevented only by advancing the timing of symmetric expansion at the lower-end line, the timing of synthesis filtering of the next picture at a predetermined division level may not be delayed as shown in FIG. 21.

Fourth Embodiment

An image decoding apparatus according to a fourth embodiment that corresponds to the image encoding apparatus 20 according to the second embodiment will be described.

FIG. 22 schematically shows a configuration of an image decoding apparatus 40 according to the fourth embodiment. Referring to FIG. 22, the image decoding apparatus 40 includes an entropy-decoding unit 41, a dequantization unit 42, and a synthesis filter bank 43.

The entropy-decoding unit 41 performs source decoding of a received encoded code-stream D40, and generates quantized coefficient data D41. As source decoding, Huffman decoding or high-efficiency arithmetic decoding can be used, as described above.

The dequantization unit 42 performs dequantization by multiplying the quantized coefficient data D41 by a quantization step size, and generates coefficient data D42. Normally, the quantization step size is described in the header of an encoded code-stream.

The synthesis filter bank 43 has a configuration similar to the band synthesis apparatus 30 shown in FIG. 16. That is, the synthesis filter bank 43 performs synthesis filtering for the coefficient data D42 to generate an image data stream, inserts a vertical blank signal into the generated image data stream, and outputs a generated video signal D43. In particular, immediately after an original sample to be subjected to symmetrical expansion for supplementation at the lower-end line of each subband of the current picture is generated, the synthesis filter bank 43 performs synthesis filtering at each division level. Thus, synthesis filtering of the current picture until division level 1 is completed before synthesis filtering of the first line of the next picture starts. The synthesis filter bank 43 may delay the timings of synthesis filtering of the next picture at predetermined one or more division levels, as described above.

The present invention is not limited to any of the first to fourth embodiments described above. Various changes and modification can be made to the present invention without departing from the spirit and scope of the present invention.

For example, although a case where the band analysis apparatus 10 according to the first embodiment performs horizontal filtering after performing vertical filtering has been described, the band analysis apparatus 10 may perform vertical filtering after performing horizontal filtering. FIG. 23 schematically shows a configuration of a band analysis apparatus 50 that performs vertical filtering after performing horizontal filtering.

In the band analysis apparatus 50, an image line input unit 51 receives a video signal D50 for each line, and supplies a data stream D51 for the image line to a column buffer unit 52. The column buffer unit 52 stores and holds data streams D51 for individual columns, and continues to store and hold data streams D51 until data streams D51 for M samples are stored. A horizontal analysis filter unit 53 sequentially reads column data D52 for M samples, and performs horizontal low-pass analysis filtering and horizontal high-pass analysis filtering.

Due to the horizontal filtering, low-frequency and high-frequency components D53, which are obtained by horizontal division, are generated. Immediately after the number of lines of the low-frequency and high-frequency components D53 reaches N, a vertical analysis filter unit 54 performs vertical low-pass analysis filtering and vertical high-pass analysis filtering. Due to the vertical filtering, a low-frequency component (1LL) D54 and high-frequency components (1HL, 1LH, and 1HH) D55, which are obtained by vertical division, are generated. The low-frequency component (1LL) D54 is supplied to the column buffer unit 52 to be subjected to analysis filtering at level 2.

As described above, a subband that is generated when horizontal filtering is performed after vertical filtering is performed is the same as a subband that is generated when vertical filtering is performed after horizontal filtering is performed.

Although hardware configurations have been described in the foregoing embodiments, a series of processing may be performed by software. In this case, a program constituting the software may be incorporated in advance in dedicated hardware of a computer, such as a read-only memory (ROM) or a hard disk, or installed from a network or a recording medium on a general-purpose personal computer capable of performing various functions by installing various programs. As the recording medium, for example, a package medium including a magnetic disk (flexible disk), an optical disk, such as compact disk-read only memory (CD-ROM) or a digital versatile disc (DVD), a magnetic optical disk, such as mini-disk (MD) (trademark), or a semiconductor memory can be used.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
hardware including
input means for inputting image data;
analysis filtering means for analysis filtering a plurality of lines of the image data between a predetermined upper-end line and a predetermined lower-end line, the analysis filtering means generating wavelet transform coefficient data of a plurality of subbands by performing a lifting operation; and
means for controlling a timing of analysis filtering such that analysis filtering of a lower-end line of the current picture is completed before analysis filtering of an upper-end line of the next picture starts.

2. The image processing apparatus according to claim 1, wherein:
the analysis filtering means performs wavelet transform processing; and
immediately after an original sample to be subjected to symmetric expansion for supplementation at the lower-end line of the current picture and the lower-end line of each of the plurality of subbands of the current picture is generated, the analysis filtering means performs symmetric expansion processing.

3. The image processing apparatus according to claim 2, wherein the analysis filtering means generates a low-frequency component and a high-frequency component by performing vertical low-pass analysis filtering and vertical high-pass analysis filtering every time the number of lines in a vertical direction reaches a predetermined value, and performs horizontal low-pass analysis filtering and horizontal high-pass analysis filtering every time the number of samples in a horizontal direction of generated low-frequency and high-frequency components reaches a predetermined value.

4. The image processing apparatus according to claim 2, wherein the analysis filtering means generates a low-frequency component and a high-frequency component by performing horizontal low-pass analysis filtering and horizontal high-pass analysis filtering every time the number of samples in a horizontal direction reaches a predetermined value, and performs vertical low-pass analysis filtering and vertical high-pass analysis filtering every time the number of lines in a vertical direction of generated low-frequency and high-frequency components reaches a predetermined value.

5. The image processing apparatus according to claim 1, further comprising:
 detecting means for detecting an end point of each of a plurality of pictures by detecting a vertical blank signal of a video signal serving as the image data.

6. The image processing apparatus according to claim 1, further comprising:
 encoding means for encoding the coefficient data of the plurality of subbands generated by the analysis filtering means to generate an encoded stream.

7. The image processing apparatus according to claim 6, wherein the encoding means includes:
 quantization means for quantizing the coefficient data of the plurality of subbands generated by the analysis filtering means to generate quantized coefficient data; and
 entropy-coding means for performing entropy coding of the quantized coefficient data generated by the quantization means to generate the encoded stream.

8. An image processing method comprising:
 inputting image data;
 analysis filtering, in a computer, a plurality of lines of the image data between a predetermined upper-end line and a predetermined lower-end line;
 generating, in the computer, wavelet transform coefficient data of a plurality of subbands by performing a lifting operation; and
 controlling, in the computer, a timing of the analysis filtering such that analysis filtering of a lower-end line of the current picture is completed before analysis filtering of an upper-end line of the next picture starts.

9. An image processing apparatus, comprising:
 hardware including
  input means for inputting coefficient data generated by performing filtering of image data for each predetermined number of lines from an upper-end line to a lower-end line; and
  synthesis filtering means for synthesis filtering the coefficient data corresponding to the predetermined number of lines between the upper-end line and the lower-end line using a lifting operation to apply an inverse wavelet transform to generate the image data; and
  means for controlling a timing of the synthesis filtering such that synthesis filtering of a lower-end line of the current picture is completed before synthesis filtering of an upper-end line of the next picture starts.

10. The image processing apparatus according to claim 9, wherein:
 the synthesis filtering means performs inverse wavelet transform processing; and
 immediately after an original sample to be subjected to symmetric expansion for supplementation at the lower-end line of each of the plurality of subbands of the current picture is generated, the synthesis filtering means performs symmetric expansion processing.

11. The image processing apparatus according to claim 9, wherein the synthesis filtering means stops synthesis filtering of one or more upper-end lines of each of the plurality of subbands of the next picture at one or more division levels for a predetermined period of time such that synthesis filtering of the upper-end line of the subband of the next picture starts after synthesis filtering of the lower-end line of the corresponding subband of the current picture is completed.

12. The image processing apparatus according to claim 9, further comprising:
 vertical blank signal insertion means for inserting a vertical blank signal between the pictures generated by the synthesis filtering means to reconstruct a video signal serving as the image data.

13. The image processing apparatus according to claim 9, further comprising:
 decoding means for generating coefficient data of the plurality of subbands by decoding an encoded stream that is generated by encoding the coefficient data of the plurality of subbands and that is input by the input means.

14. The image processing apparatus according to claim 13, wherein the decoding means includes:
 entropy-decoding means for performing entropy decoding of the encoded stream to generate quantized coefficient data of the plurality of subbands; and
 dequantization means for dequantizing the quantized coefficient data generated by the entropy-decoding means to generate the coefficient data of the plurality of subbands.

15. An image processing method comprising:
 inputting coefficient data generated by performing filtering of image data for each predetermined number of lines from an upper-end line to a lower-end line; and
 generating, in a computer, the image data by performing vertical and horizontal synthesis filtering of the input coefficient data using a lifting operation to apply an inverse wavelet transform to the coefficients; and
 controlling, in the computer, a timing of the synthesis filtering such that synthesis filtering of a lower-end line of the current picture is completed before synthesis filtering of an upper-end line of the next picture starts.

16. An image processing apparatus, comprising:
 hardware including
  an input unit that inputs image data; and
  an analysis filtering unit that performs analysis filtering a plurality of lines of the image data between a predetermined upper-end line and a predetermined lower-end line, the analysis filtering means and generates wavelet coefficient data of a plurality of subbands by performing a lifting operation, the analysis filtering unit controlling a timing of the analysis filtering such that analysis filtering of a lower-end line of the current picture is completed before analysis filtering of an upper-end line of the next picture starts.

17. An image processing apparatus, comprising:
hardware including
an input unit that inputs coefficient data generated by performing filtering of image data for each predetermined number of lines from an upper-end line to a lower-end line; and
a synthesis filtering unit that performs synthesis filtering the coefficient data corresponding to the predetermined number of lines between the upper-end line and the lower-end line using a lifting operation to apply an inverse wavelet transform to generate the image data, the synthesis filtering unit controlling a timing of the synthesis filtering such that synthesis filtering of a lower-end line of the current picture is completed before synthesis filtering of an upper-end line of the next picture starts.

* * * * *